United States Patent
Lee et al.

(10) Patent No.: US 10,481,790 B2
(45) Date of Patent: Nov. 19, 2019

(54) METHOD AND APPARATUS FOR INPUTTING INFORMATION BY USING ON-SCREEN KEYBOARD

(71) Applicant: SAMSUNG MEDISON CO., LTD., Hongcheon-gun (KR)

(72) Inventors: Seung-ju Lee, Hongcheon-gun (KR); Yoon-woo Jun, Seoul (KR)

(73) Assignee: SAMSUNG MEDISON CO., LTD., Hongcheon-gun (KR)

( * ) Notice: Subject to any disclaimer, the term of this patent is extended or adjusted under 35 U.S.C. 154(b) by 544 days.

(21) Appl. No.: 14/793,814

(22) Filed: Jul. 8, 2015

(65) Prior Publication Data

US 2016/0170636 A1    Jun. 16, 2016

(30) Foreign Application Priority Data

Dec. 11, 2014 (KR) .................. 10-2014-0178708

(51) Int. Cl.
```
G06F 3/048      (2013.01)
G06F 3/0488     (2013.01)
G06F 3/0481     (2013.01)
G06F 3/0482     (2013.01)
G06F 3/0484     (2013.01)
```
(52) U.S. Cl.
CPC ........ G06F 3/04886 (2013.01); G06F 3/0482 (2013.01); G06F 3/04817 (2013.01); G06F 3/04842 (2013.01)

(58) Field of Classification Search
None
See application file for complete search history.

(56) References Cited

U.S. PATENT DOCUMENTS

```
6,571,235 B1 *   5/2003  Marpe ............... G06F 17/30873
2002/0178157 A1* 11/2002  DeGilio .............. G06Q 10/10
2003/0199288 A1* 10/2003  Bodnar ............... H04M 1/0254
                                                          455/557
```
(Continued)

FOREIGN PATENT DOCUMENTS

```
JP       2013-178800 A    9/2013
KR    10-2010-0048289 A    5/2010
```
(Continued)

OTHER PUBLICATIONS

Communication dated Feb. 3, 2016, issued by the European Patent Office in counterpart European Patent Application No. 15180262.6.

*Primary Examiner* — Andrey Belousov
*Assistant Examiner* — Haimei Jiang
(74) *Attorney, Agent, or Firm* — Sughrue Mion, PLLC

(57) ABSTRACT

A device includes a display unit configured to display an on-screen keyboard for inputting data in a first input field from among a plurality of input fields, and to display on the on-screen keyboard identification information of at least one input field from among the plurality of input fields, except for the first input field; a user input unit for receiving a user input selecting one of a plurality of pieces of identification information of the at least one input field; and a control unit for determining the at least one input field whose identification information is selected as a second input field in which data is to be input via the on-screen keyboard.

12 Claims, 29 Drawing Sheets

(56) References Cited

U.S. PATENT DOCUMENTS

| | | | |
|---|---|---|---|
| 2004/0030563 A1* | 2/2004 | Porcari | G06Q 30/02 |
| | | | 705/35 |
| 2005/0166160 A1* | 7/2005 | Bergstrom | H04M 1/2745 |
| | | | 715/780 |
| 2008/0320410 A1* | 12/2008 | Whytock | G06F 3/04886 |
| | | | 715/773 |
| 2009/0172585 A1* | 7/2009 | Sato | H04N 1/00384 |
| | | | 715/773 |
| 2011/0087990 A1* | 4/2011 | Ng | G06F 3/04886 |
| | | | 715/773 |
| 2012/0084663 A1* | 4/2012 | Momchilov | G06F 3/0481 |
| | | | 715/744 |
| 2013/0061124 A1* | 3/2013 | Patton | G06F 17/243 |
| | | | 715/224 |
| 2013/0113720 A1* | 5/2013 | Van Eerd | G06F 3/04883 |
| | | | 345/173 |
| 2013/0283195 A1* | 10/2013 | Bilgen | G06F 3/0485 |
| | | | 715/767 |
| 2014/0173407 A1 | 6/2014 | Kruglick | |
| 2014/0310649 A1* | 10/2014 | Bernstein | G06F 3/0482 |
| | | | 715/808 |

FOREIGN PATENT DOCUMENTS

| | | |
|---|---|---|
| KR | 10-1261227 B1 | 5/2013 |
| KR | 10-2014-0051201 A | 4/2014 |

* cited by examiner

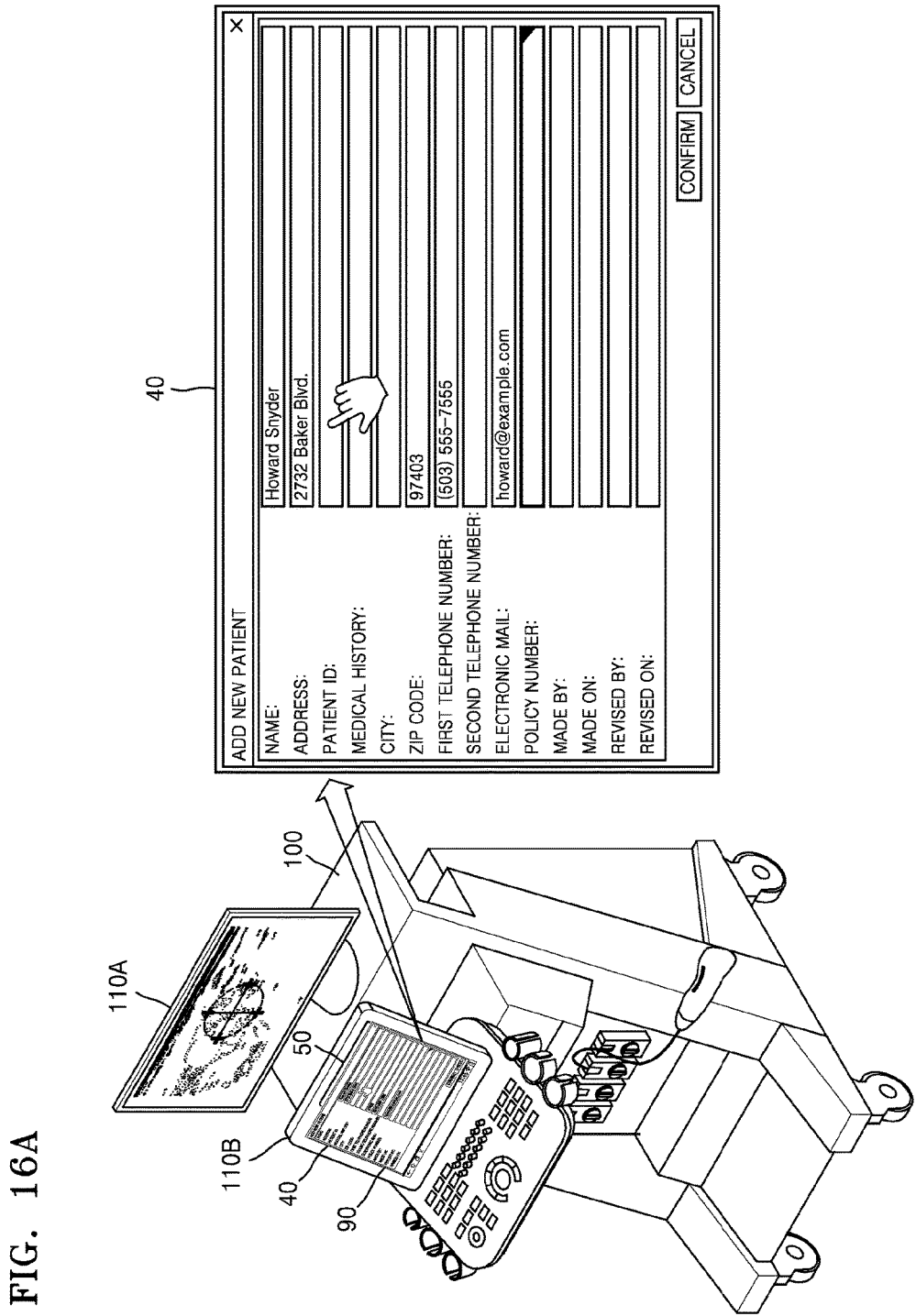

METHOD AND APPARATUS FOR INPUTTING INFORMATION BY USING ON-SCREEN KEYBOARD

RELATED APPLICATION

This application claims the benefit of Korean Patent Application No. 10-2014-0178708, filed on Dec. 11, 2014, in the Korean Intellectual Property Office, the disclosure of which is incorporated herein in its entirety by reference.

BACKGROUND

1. Field

One or more exemplary embodiments relate to a method and apparatus for inputting information in an input field by using an on-screen keyboard.

2. Description of the Related Art

With the expanded use of portable smart devices, the need of inputting information by using an on-screen keyboard displayed on a screen, without a physical keyboard, has increased.

However, when the on-screen keyboard is used in a page having a lot of items to be input, such as a member joining page, unnecessary touch inputs may occur. For example, whenever input fields are changed, a touch input for closing and re-opening the on-screen keyboard may become necessary. Also, a plurality of touch inputs may become required, when some of input fields are skipped or returns to previous input fields are made, as not all items are needed to be input. Thus, there is a need to reduce unnecessary touch inputs when a user uses the on-screen keyboard.

SUMMARY

One or more exemplary embodiments include a method and apparatus for selecting an input field in an on-screen keyboard and inputting information in the selected input field.

Additional aspects will be set forth in part in the description which follows and, in part, will be apparent from the description, or may be learned by practice of the presented embodiments.

According to one or more exemplary embodiments, a device includes: a display unit configured to display an on-screen keyboard for inputting data in a first input field among a plurality of input fields, and to display on the on-screen keyboard identification information of at least one input field other than the first input field, from among the plurality of input fields; a user input unit for receiving a user input selecting one of a plurality of pieces of identification information identifying the at least one input field; and a control unit for setting, as a second input field in which data is to be input via the on-screen keyboard, the at least one input field whose identification information is selected.

The display unit may display a page including the plurality of input fields. The user input unit may receive a user input selecting the first input field from among the plurality of input fields included in the page. The display unit may display on the page the on-screen keyboard for inputting data in the first input field, when the user input selecting the first input field is received.

The at least one input field may include at least one of an input field prior to the first input field and an input field after the first input field.

The on-screen keyboard may include a text box indicating a key value of a key selected by a user from among a plurality of keys in the on-screen keyboard.

The identification information of the at least one input field may include at least one of a field name of the at least one input field and an icon indicating the at least one input field.

The on-screen keyboard may include a portion indicating whether the first input field is an input field corresponding to a pre-requisite item.

The display unit may display the at least one input field such that an input field from among the at least one input field whose field value is input is distinguished from an input field from among the at least one input field whose field value is not input.

The on-screen keyboard may include a drop-down menu for selecting one from among the at least one input field when the at least one input field includes at least two input fields. The user input unit may receive a user input selecting the drop-down menu. The display unit may display the identification information of the at least one input field, when the user input selecting the drop-down menu is received.

The drop-down menu may include a prior field drop-down menu for selecting one of input fields that are prior to the first input field, and a next field drop-down menu for selecting one of input fields that are after the first input field.

The drop-down menu may include a first drop-down menu for selecting one of input fields in which field values have been input, and a second drop-down menu for selecting one of input fields in which field values have not been input.

According to one or more exemplary embodiments, a method of inputting information includes: displaying an on-screen keyboard for inputting data in a first input field among a plurality of input fields, and displaying on the on-screen keyboard, identification information of at least one input field other than the first input field, from among the plurality of input fields; receiving a user input selecting one of a plurality of pieces of identification information identifying the at least one input field; and setting, as a second input field in which data is to be input via the on-screen keyboard, the at least one input field whose identification information is selected.

The displaying of the on-screen keyboard for inputting data in the first input field among the plurality of input fields may include: displaying a page including the plurality of input fields; receiving a user input selecting the first input field from among the plurality of input fields included in the page; and displaying on the page the on-screen keyboard for inputting data in the first input field, when the user input selecting the first input field is received.

The displaying of the identification information of the at least one input field other than the first input field, from among the plurality of input fields, may include displaying the at least one input field such that an input field from among the at least one input field whose field value is input is distinguished from an input field from among the at least one input field whose field value is not input.

The on-screen keyboard may include a drop-down menu for selecting one from among the at least one input field when the at least one input field includes at least two input fields. The displaying of the identification information of the at least one input field from among the plurality of input fields, may include receiving a user input selecting the drop-down menu, and displaying the identification information of the at least one input field when the user input selecting the drop-down menu is received.

BRIEF DESCRIPTION OF THE DRAWINGS

Embodiments of the invention now will be described more fully hereinafter with reference to the accompanying drawings, in which reference numerals denote structural elements.

FIGS. 16A through 16C are views for describing a method of moving a display location of a page, via a device, when an input field in which data is to be input is changed on an on-screen keyboard, according to an embodiment.

DETAILED DESCRIPTION

Figure 1:
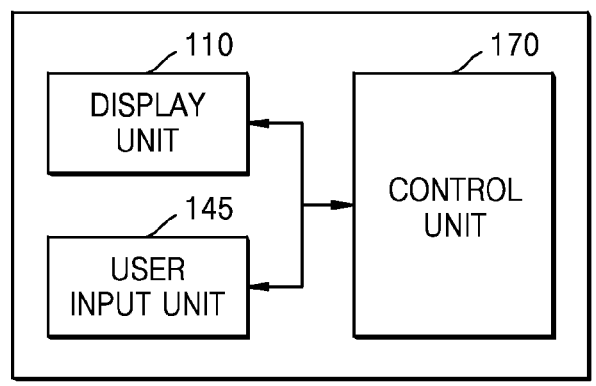
FIG. 1 is a block diagram of a device according to an embodiment.

Hereinafter, the terms used in the specification will be briefly defined, and the embodiments will be described in detail.

The terms used in this specification are those general terms currently widely used in the art in consideration of functions regarding the present invention, but the terms may vary according to the intention of those of ordinary skill in the art, precedents, or new technology in the art. Also, some terms may be arbitrarily selected by the applicant, and in this case, the meaning of the selected terms will be described in detail in the detailed description of the present specification. Thus, the terms used in the specification should be understood not as simple names but based on the meaning of the terms and the overall description of the invention.

When a part "includes" or "comprises" an element, unless there is a particular description contrary thereto, the part can further include other elements, not excluding the other elements. In addition, terms such as " . . . unit," " . . . module," or the like refer to units that perform at least one function or operation, and the units may be implemented as hardware or software or as a combination of hardware and software.

Throughout the specification, an "input field" may denote a medium of a graphical user interface for receiving data from a user with respect to an item.

For example, an input field for receiving data corresponding to one item may be displayed. When the input field displayed on a screen is selected, a user may input data into the selected input field. Also, the user may store the input data, in correspondence to the selected input field. The input field may be referred to as a text field or a text entry box, according to embodiments.

Throughout the specification, a "screen keyboard" may denote a virtual keyboard displayed on a screen.

For example, when a user selects an image indicating a key in the on-screen keyboard, a value of the key indicated by the selected image may be determined as a value of the input of the user. Also, the on-screen keyboard may be referred to as a virtual keyboard or an on-screen keyboard, according to embodiments.

Reference will now be made in detail to embodiments, examples of which are illustrated in the accompanying drawings. In this regard, the present embodiments may have different forms and should not be construed as being limited to the descriptions set forth herein. Also, parts in the drawings unrelated to the detailed description are omitted to ensure clarity of the inventive concept. Like reference numerals refer to like elements throughout.

FIG. 1 is a block diagram of a device 100 according to an embodiment.

Referring to FIG. 1, the device 100 may include a display unit 110, a user input unit 145, and a control unit 170.

The display unit 110 may display information that is to be provided to a user.

For example, the display unit 110 may display a page including a plurality of input fields. Also, the display unit 110 may display an on-screen keyboard for inputting data in a first input field, when a user input selecting the first input field from among the plurality of input fields in the page is received. Also, the display unit 110 may display identification information of at least one input field from among the plurality of input fields, except for the first input field, on the on-screen keyboard.

The user input unit 145 may be an input device for inputting data, commands, or requests to the device 100.

For example, the user input unit 145 may receive a user input selecting one of a plurality of pieces of identification information of the at least one input field in the on-screen keyboard.

The control unit 170 may generally control the configuration of the device 100 including the user input unit 145 and the control unit 170.

For example, the control unit 170 may determine the at least one input field whose identification information is selected by a user, as a second input field in which data is to be input via the on-screen keyboard.

Figure 2A:
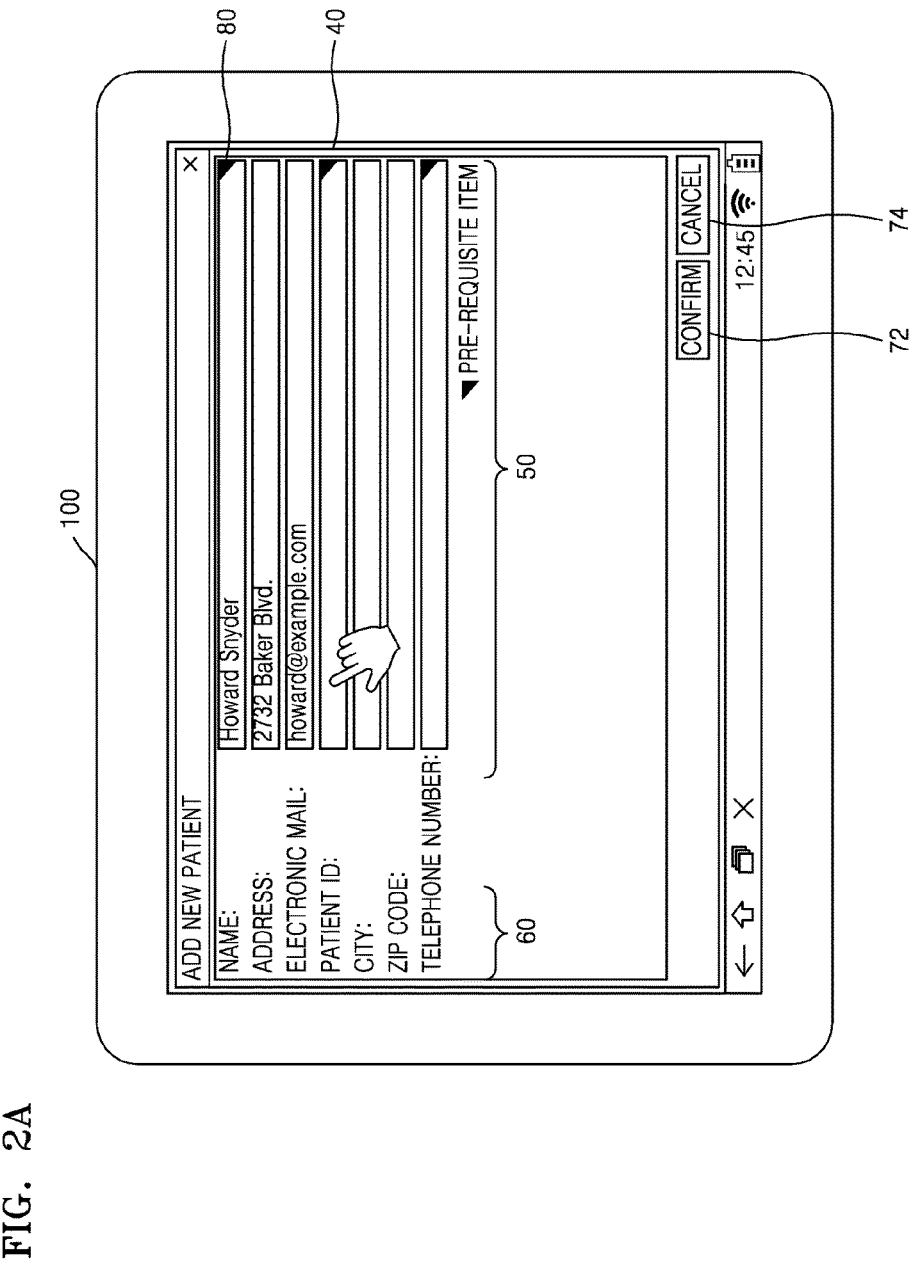
FIGS. 2A, 2B, and 2C are views for describing a method of receiving data from a user, via a device, according to an embodiment.
Figure 2B:
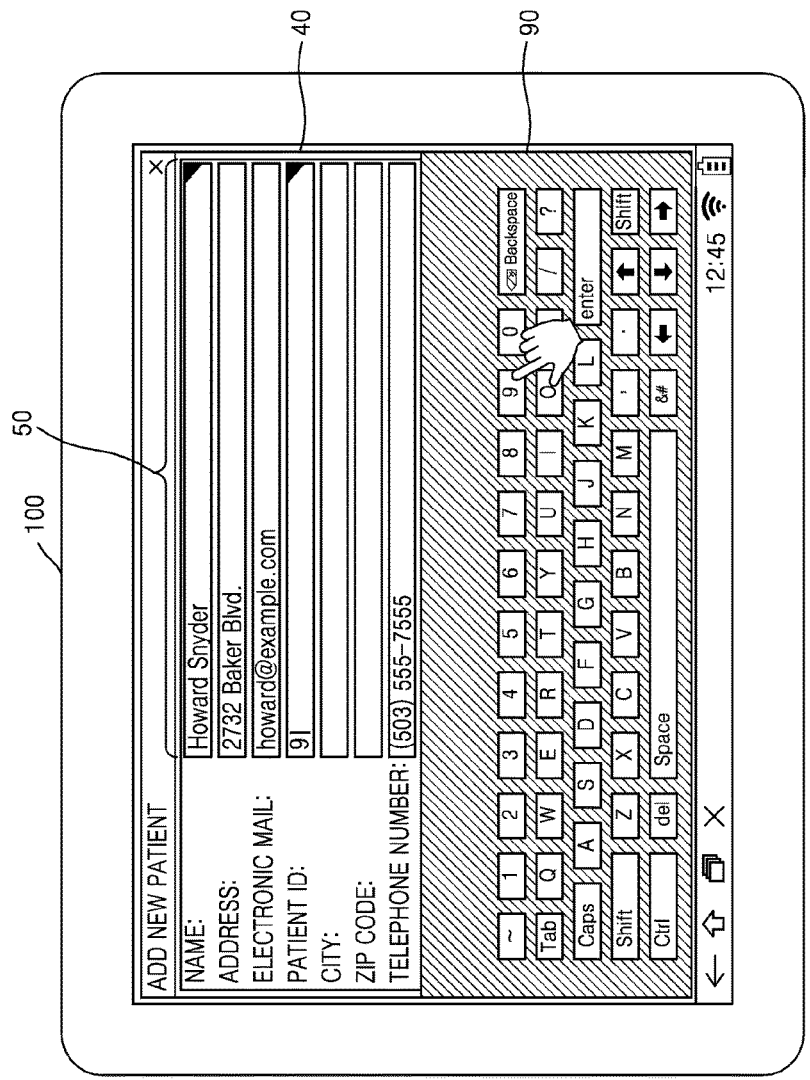
Figure 2C:
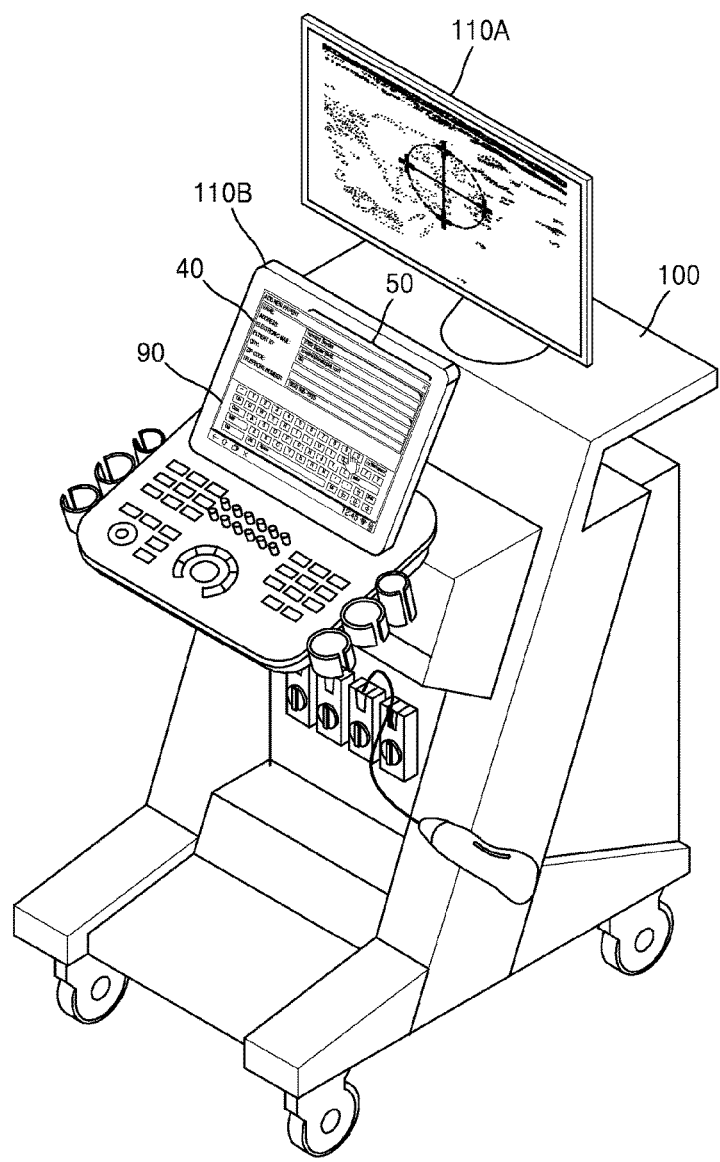

FIGS. 2A, 2B, and 2C are views for describing a method of receiving data from a user via the device 100, according to an embodiment.

Referring to FIG. 2A, the device 100 may be smart devices, such as cellular phones and tablet personal computers (PCs).

The device 100 may display a page 40 including a plurality of input fields 50 and field names 60 of the plurality of input fields 50.

For example, the device 100 may display the page 40 for adding new patients. Items that are required when adding new patients may include a patient name, an address, an e-mail address, a patient ID, a city name, a zip code, and a telephone number. Accordingly, the device 100 may display the page 40 including the input fields 50 corresponding to the items and the field names 60 of the input fields 50.

The field names 60 of the input fields 50 may be pre-determined in the device 100, in correspondence to the items. Also, the field names 60 of the input fields 50 may be images or texts indicating the items.

Also, some of the plurality of items may be pre-requisite items that have to be necessarily input to add new patients. The device 100 may display on the input field 50 corresponding to the pre-requisite item an image 80 indicating that the input field 50 is an input field of a pre-requisite item.

Also, the device 100 may display a confirmation button 72 for adding a new patient to a database. When a user input selecting the confirmation button 72 is received, the device 100 may add the new patient to the database, by storing text data input in the input field, in correspondence to an item of the input field. Also, the device 100 may not store the text data input in the input field and may display a cancel button 74 for returning to a previous page.

Referring to FIG. 2B, when a user input selecting one from among the plurality of input fields 50 is received, the device 100 may display an on-screen keyboard 90 for inputting text data in the selected input field.

The device 100 may display the on-screen keyboard 90 on a portion of a screen. Also, the device 100 may display the on-screen keyboard 90 on the entire portion of the screen.

The on-screen keyboard 90 may indicate number keys, text keys, sign keys, and function keys. When a user input selecting one of the keys of the on-screen keyboard 90 is received, the device 100 may display a key value of the selected key, on the selected input field of the page 40. For example, when a user input selecting a key indicating number 9 from among the plurality of keys in the on-screen keyboard 90 is received, the device 100 may display number 9 on the input field of the page 40.

Referring to FIG. 2C, the device 100 may be an ultrasound image apparatus.

The ultrasound image apparatus may include a main display unit 110A for displaying an ultrasound image and a sub-display unit 110B for displaying an image for controlling the ultrasound image apparatus.

The ultrasound image apparatus may display the page 40 for adding new patients on a screen of the sub-display unit 110B. Also, the ultrasound image apparatus may display on the page 40 the on-screen keyboard 90 for inputting text data in the input field that is selected by the user from among the plurality of input fields 50 in the page 40.

Figure 3:
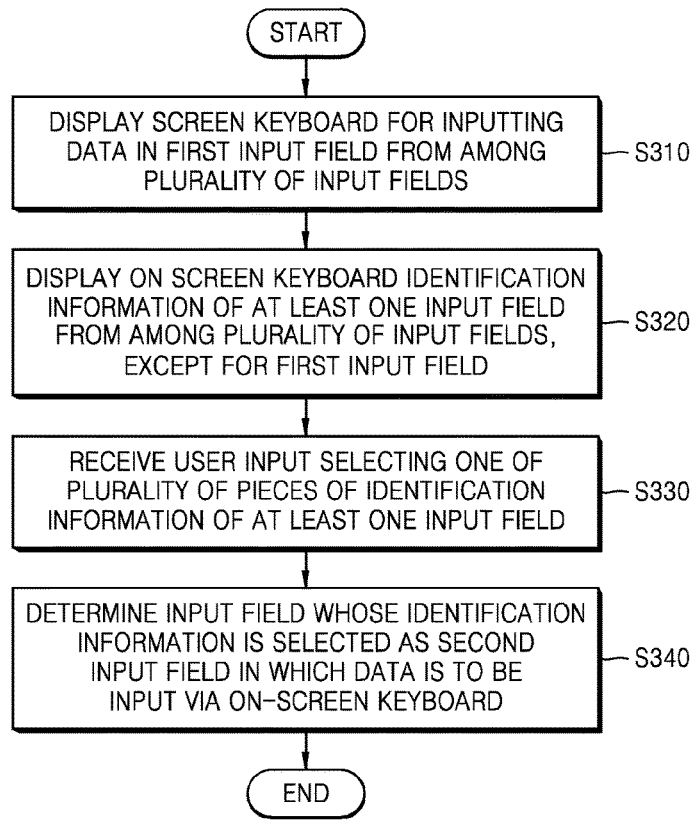
FIG. 3 is a flowchart illustrating a method of receiving a user input inputting text data in an input field, via a device, according to an embodiment.

FIG. 3 is a flowchart of a method of receiving a user input inputting text data in an input field, via the device 100, according to an embodiment.

The device 100 may display an on-screen keyboard for inputting data in a first input field from among a plurality of input fields, in operation S310.

For example, the device 100 may display a page including the plurality of input fields. Also, the device 100 may receive a user input selecting the first input field from among the plurality of input fields in the page. When the user input selecting the first input field is received, the device 100 may display on the page the on-screen keyboard for inputting data in the first input field.

Also, the on-screen keyboard may include a text box indicating a key value of a key selected by a user from among a plurality of keys in the on-screen keyboard. Also, the on-screen keyboard may include a portion indicating a data format of the first input field. Also, the on-screen keyboard may include a portion indicating whether the first input field is an input field corresponding to a pre-requisite item.

Also, when a user input touching a plurality of keys in the on-screen keyboard is received, the device 100 may display a key value of the touched key, on the first input field in the page or on the text box in the on-screen keyboard.

The device 100 may display identification information of at least one input field from among the plurality of input fields, except for the first input field, on the on-screen keyboard, in operation S320.

The identification information of the input field may include at least one of a field name of the input field and an icon indicating the input field.

Also, the at least one input field may include at least one of a previous input field of the first input field and a next input field of the first input field. For example, an order of the plurality of input fields may be pre-stored in the device 100. For example, an order of items corresponding to the plurality of input fields may be pre-determined in the device 100. Accordingly, the device 100 may determine the order of the input fields corresponding to the items, according to the order of the items. Also, the device 100 device 100 may display the input fields corresponding to the items, according to the order of the items, from top to bottom or from left to right. In this case, the order of the input fields may correspond to a display order of the input fields.

Also, the device 100 may display the at least one input field such that an input field from among the at least one input field whose field value is set is distinguished from an input field whose field value is not set.

The on-screen keyboard may include a drop-down menu for selecting one from among the at least one input field. In this case, the device 100 may receive a user input selecting the drop-down menu, and may display identification information of at least one input field, when receiving the user input selecting the drop-down menu.

Also, the drop-down menu may include a previous field drop-down menu for selecting one from among input fields that are previous to the first input field and a next field drop-down menu for selecting one from among input fields that are next to the first input field.

Also, the drop-down menu may include an input completed drop-down menu for selecting one of input fields whose field values are set and an input requiring drop-down menu for selecting one of input fields whose filed values are not set.

The device 100 may receive a user input selecting one of a plurality of pieces of identification information of the at least one input field, in operation S330.

The device 100 may determine the input field whose identification information is selected as a second input field in which text data is to be input via the on-screen keyboard, in operation S340.

When the input field corresponding to the touched portion is determined as the second input field, the device 100 may store a key value of at least one key in the on-screen keyboard, which is displayed on a text box, as a field value of the first input field.

Also, when the input field corresponding to the touched portion is determined as the second input field, if the device 100 receives a user input touching a plurality of keys in the on-screen keyboard, the device 100 may display a key value of the touched key in the second input field in the page or on the text box in the on-screen keyboard.

Accordingly, the user may select an input field on the on-screen keyboard and precisely set data in the input field, without moving back and forth from the page to the on-screen keyboard or without identifying input values by alternately checking the page and the on-screen keyboard.

Figure 4A:
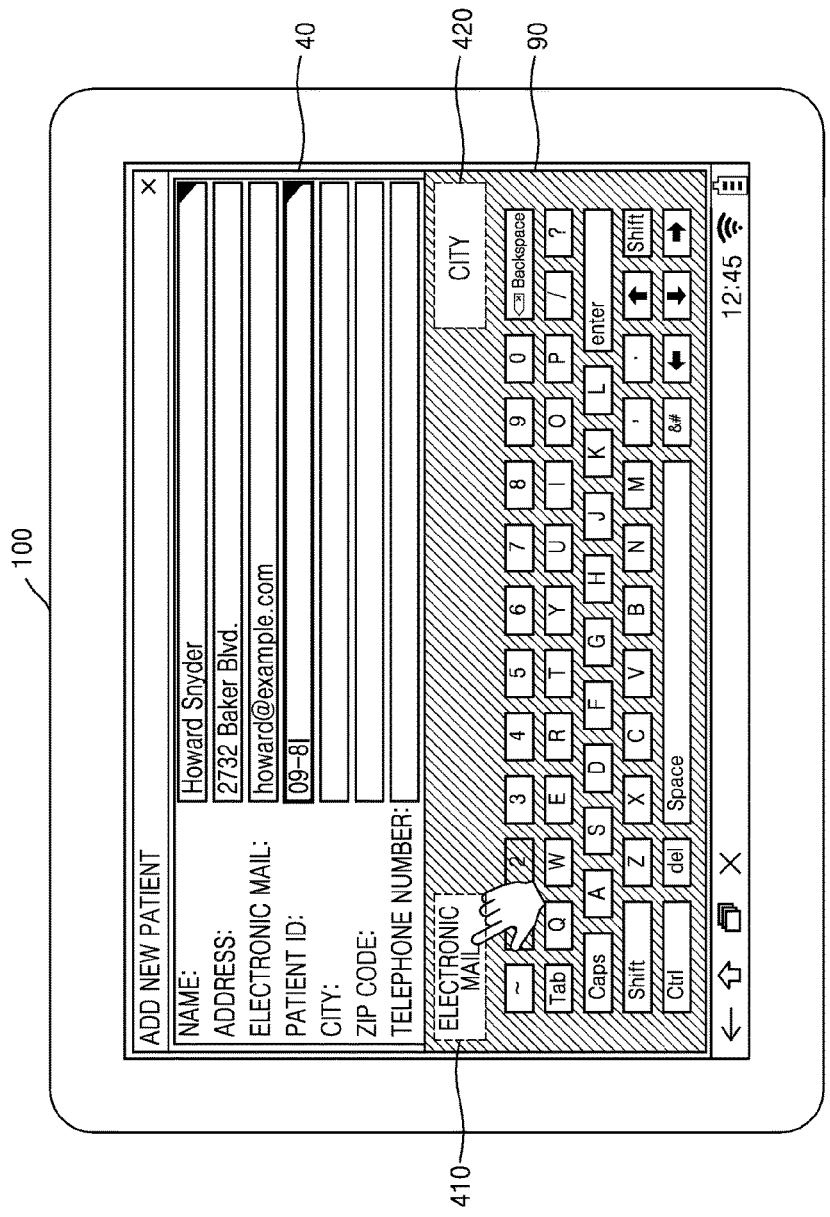
FIG. 4A is a view for describing a method of displaying on an on-screen keyboard identification information of selectable input fields, via a device, according to an embodiment.

FIG. 4A is a view for describing a method of displaying on the on-screen keyboard 90 identification information of input fields which are selectable, via the device 100, according to an embodiment.

Referring to FIG. 4A, the device 100 may display on the on-screen keyboard 90 the identification information of the input fields which are selectable for a user on the on-screen keyboard 90.

For example, when a user input touching an input field corresponding to an item of patient ID from among the input fields illustrated in FIG. 2A is received, the device 100 may determine the input field corresponding to the item of patient ID as a first input field in which text data is to be input via the on-screen keyboard 90. Also, the device 100 may display the on-screen keyboard 90 for inputting text data in the first input field.

Also, the device 100 may determine a previous input field of the first input field and a next input field of the first input field. The previous input field and the next input field of the first input field may be determined based on an order of the input fields pre-stored in the device 100.

When the previous input field and the next input field with respect to the first input field are determined, the device 100 may display identification information of the previous input field of the first input field, on a previous field information displaying portion 410, and may display identification information of a second input field on a next field information displaying portion 420. The previous and next field information displaying portions may be button type interface objects.

The device 100 may display a field name of the previous input field of the first input field, on the previous field displaying portion 410 on the screen board. Also, the device 100 may display a field name of the next input field of the first input field on the next field displaying portion 420 on the screen board.

For example, the device 100 may display "electronic mail" that is the field name of the previous input field of the input field corresponding to the item of patient ID, on the previous field displaying portion 410. Also, the device 100 may display "city" that is the field name of the next input field of the input field corresponding to the item of patient ID, on the next field displaying portion 420.

Also, when a user input touching the input field corresponding to the item of patient ID from among the input fields illustrated in FIG. 2A is received, the device 100 may display, on the selected input field in the page, an image indicating that the input field is a selected input field. For example, the device 100 may display on the selected input field an image indicating a cursor. Also, the device 100 may change a frame line of the selected input field as a color that is different from its original color.

Thus, since the field name of the input field is displayed on the on-screen keyboard 90, the user does not need to check the page 40 to identify what the previous field or the next field of the current input field is.

Figure 4B:
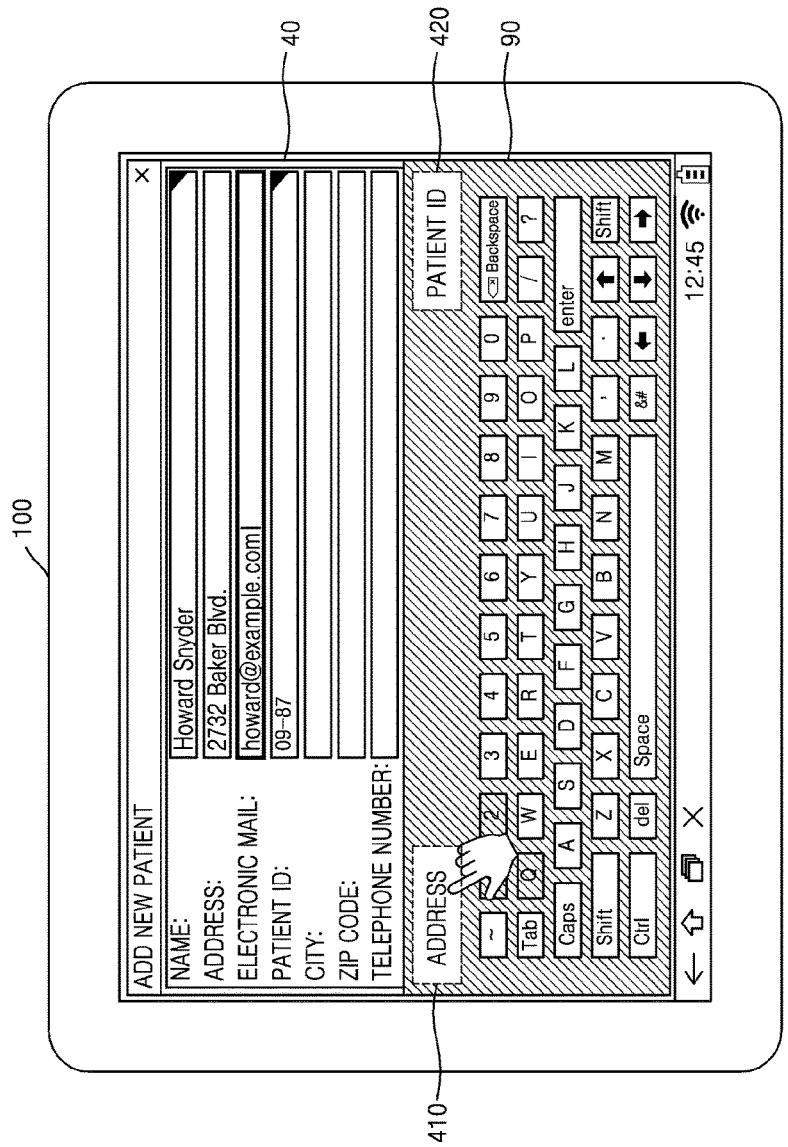
FIG. 4B is a view for describing a method of displaying on an on-screen keyboard identification information of selectable input fields, via a device, when the device receives a user input touching a previous field displaying portion, according to an embodiment.

FIG. 4B is a view for describing a method of determining an input field in which data is to be input via the on-screen keyboard 90, via the device 100, when the device 100 receives a user input touching the previous field displaying portion 410, according to an embodiment.

Referring to FIG. 4B, when the user input touching the previous field displaying portion 410 in the on-screen keyboard 90 is received, the device 100 may determine an input field corresponding to the touched portion as a second input field.

For example, when receiving the user input touching the previous field displaying portion 410 in the on-screen keyboard 90, illustrated in FIG. 4A, the device 100 may determine an input field corresponding to "electronic mail" that is the field name indicated in the previous field displaying portion 410 as the second input field.

When the second input field is determined, the device 100 may display a field name of the previous input field of the second input field, on the previous field displaying portion 410 and may display a field name of the next input field of the second input field, on the next field displaying portion 420.

For example, the device 100 may display "address" that is the field name of the previous input field of the second input field on the previous field displaying portion 410 and may display "patient ID" that is the field name of the next input field of the second input field on the next field displaying portion 420.

Also, the device 100 may display on the second input field in the page an image indicating that the input field is the input field selected by a user. For example, the device 100 may change a frame line of the input field corresponding to the item of the electronic mail as a color that is different from its original color.

Also, when the device 100 receives a user input touching a series of keys from among a plurality of keys in the on-screen keyboard 90, the device 100 may display key values of the selected series of keys on the second input field in the page.

Thus, the user may select other input fields than the current input field, on the on-screen keyboard 90, without deleting the on-screen keyboard 90.

Figure 4C:
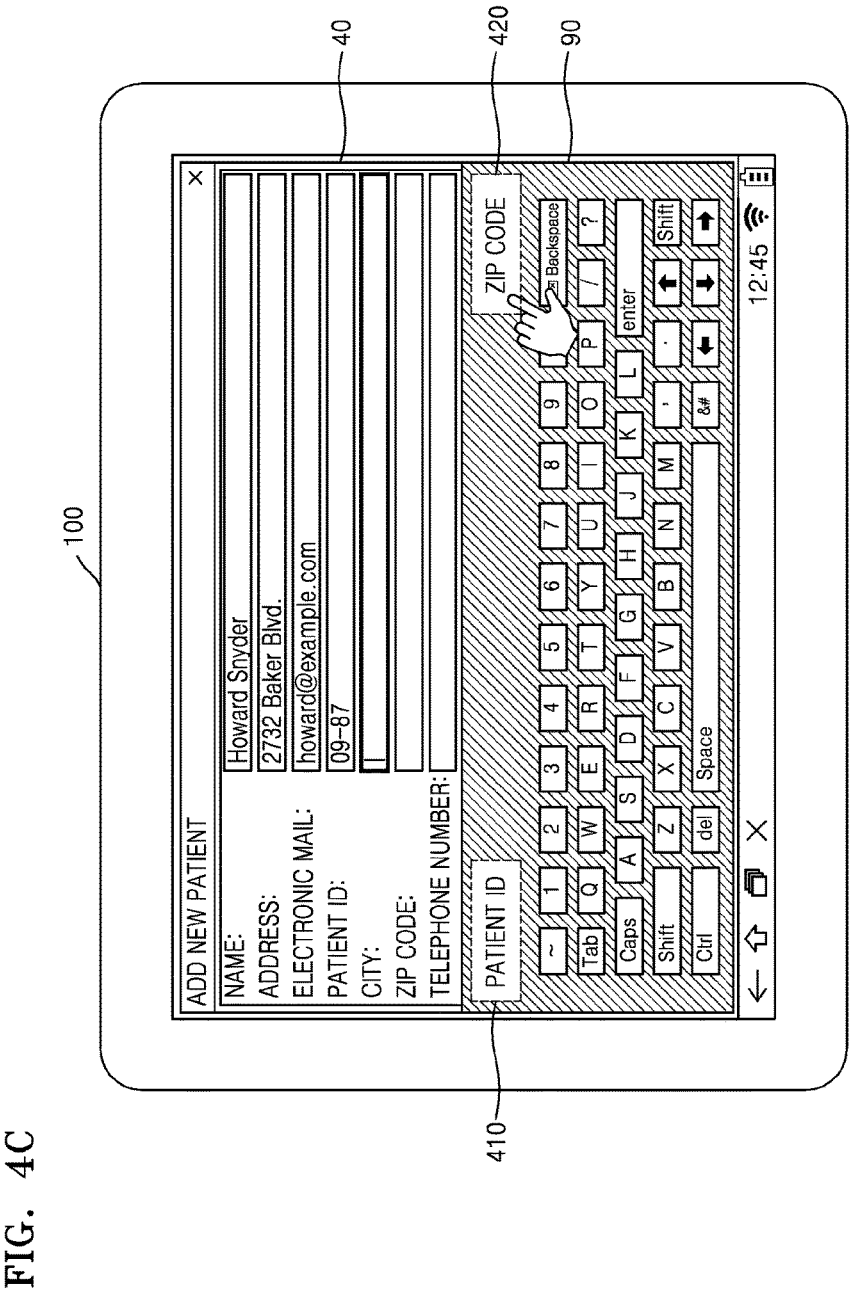
FIG. 4C is a view for describing a method of displaying on an on-screen keyboard identification information of selectable input fields, via a device, when the device receives a user input touching a next field displaying portion, according to an embodiment.

FIG. 4C is a view for describing a method of determining an input field in which data is to be input via the on-screen keyboard 90, via the device 100, when the device 100 receives a user input touching the next field displaying portion 420, according to an embodiment.

Referring to FIG. 4C, when receiving the user input touching the next field displaying portion 420 in the on-screen keyboard 90, the device 100 may determine an input field corresponding to the touched portion as a second input field.

For example, when receiving the user input touching the next field displaying portion 420 in the on-screen keyboard 90, illustrated in FIG. 4A, the device 100 may determine an input field corresponding to a "city" item, the field name of which is displayed on the next field displaying portion 420, as the second input field.

When the second input field is determined, the device 100 may display a field name of the previous input field of the second input field on the previous field displaying portion 410 and may display a field name of the next input field of the second input field on the next field displaying portion 420.

For example, the device may display "patient ID" that is the field name of the previous input field of the second input field on the previous field displaying portion 410, and "zip code" that is the field name of the next input field of the second input field on the next field displaying portion 420.

Also, the device 100 may display on the second input field in the page an image indicating that the input field is the input field selected by a user. For example, the device 100 may change a frame line of the input field corresponding to the item of the city as a color that is different from its original color.

Also, when receiving a user input touching a series of keys from among a plurality of keys in the on-screen keyboard 90, the device 100 may display key values of the selected series of keys on the second input field.

Also, when the field name displayed on the previous field displaying portion 410 or the next field displaying portion 420 is a field name corresponding to a first or a last input field, the device 100 may indicate that the input field is the first or the last input field. For example, the device 100 may indicate that the input field is the first or the last input field by dimming the color of the previous field displaying portion 410 or the next field displaying portion 420.

Also, when receiving a user input touching a pre-determined key (for example, an "enter" key) from among the plurality of keys in the on-screen keyboard 90, the device 100 may delete the on-screen keyboard 90 and may display again the page 40 throughout the screen.

Thus, the user may select other input fields than the current input field on the on-screen keyboard 90, without deleting the on-screen keyboard 90.

Figure 5A:
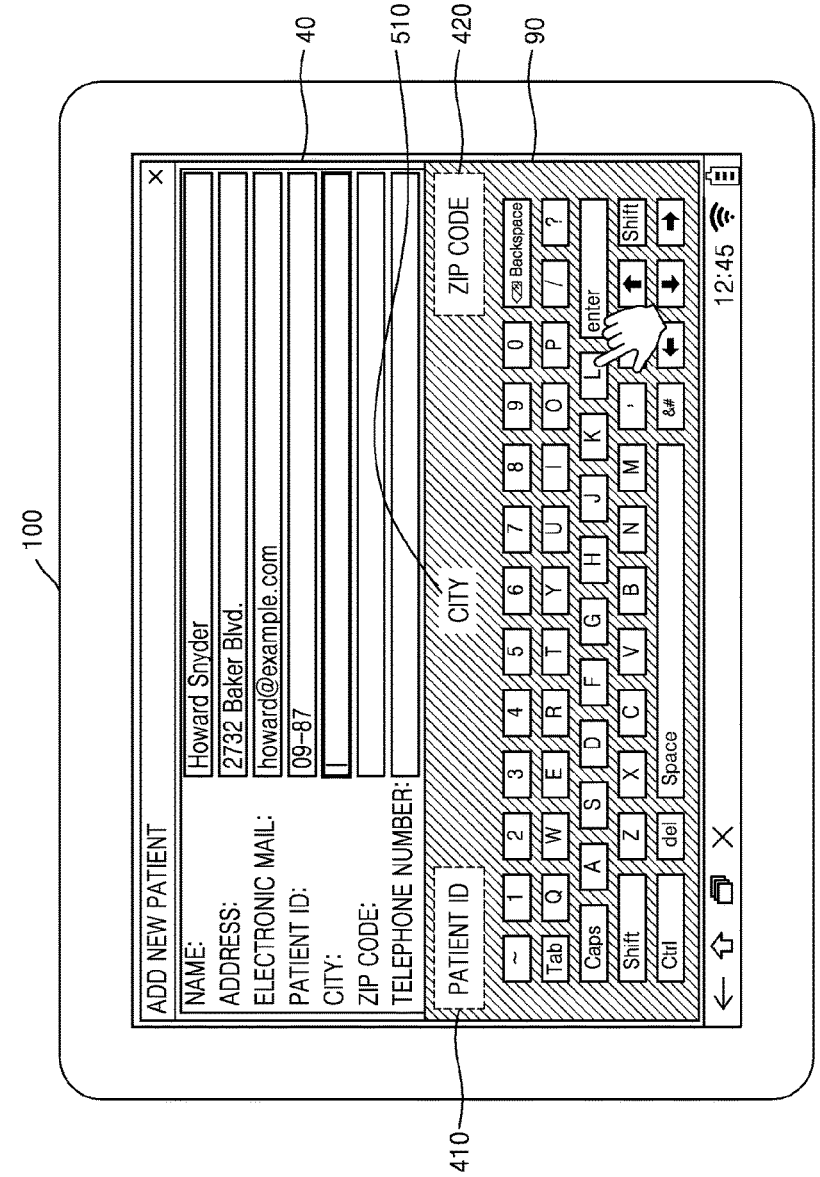
FIGS. 5A and 5B are views for describing a method of displaying on an on-screen keyboard identification information of a first input field, according to an embodiment.
Figure 5B:
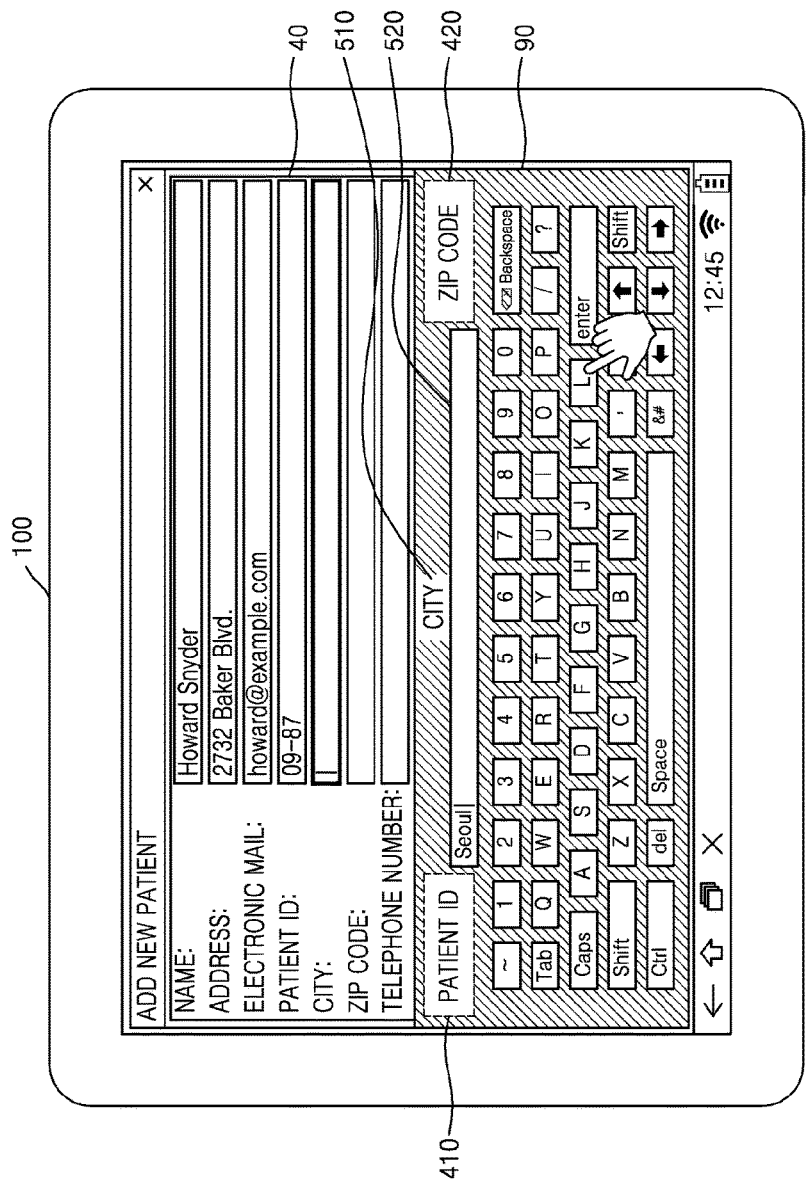

FIGS. 5A and 5B are views for describing a method of displaying on the on-screen keyboard 90 identification information of the first input field, according to an embodiment.

Referring to FIG. 5A, the device 100 may display a field name 510 of the first input field in which text data is input via the on-screen keyboard 90, on the on-screen keyboard 90.

The device 100 may display the field name 510 of the first input field on the on-screen keyboard 90, in addition to the field name of the previous input field or of the next input field of the first input field. For example, when the input field corresponding to the item of the city is determined as the first input field, the device 100 may display "city" that is the field name of the first input field, on the on-screen keyboard 90, in addition to "patient ID" that is the field name of the previous input field of the first input field and "zip code" that is the field name of the next input field of the first input field.

Referring to FIG. 5B, the device 100 may display a text box 520 on the on-screen keyboard 90, along with the field name of the first input field.

The device 100 may display key values of a series of keys which are selected by a user from among a plurality of keys included in the on-screen keyboard 90, on the text box 520.

For example, when the device 100 receives a user input touching "S," "e," "o," "u," and "l" in a sequential order, via the on-screen keyboard 90, the device 100 may display "Seoul" on the text box 520.

Thus, the user may identify the key values that the user inputs on the on-screen keyboard 90, without moving his/her eyes onto the page 40 to check the key values that are input by the user.

Figure 6:
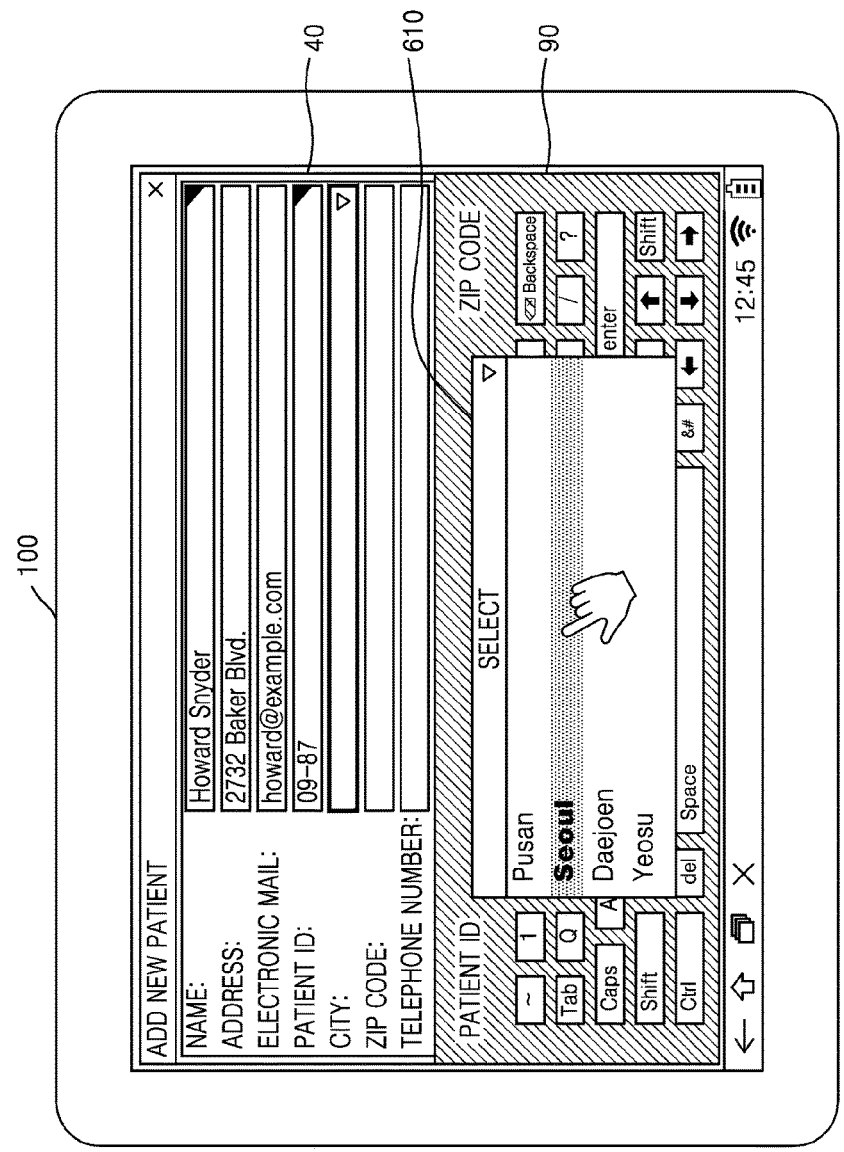
FIG. 6 is a view for describing a method of inputting information in an input field of a drop down format, via a device, according to an embodiment.

FIG. 6 is a view for describing a method of inputting information in an input field of a drop-down format, via the device 100, according to an embodiment.

Referring to FIG. 6, when a selected input field is of a drop-down format, the device 100 may display a drop-down interface object 610 on the on-screen keyboard 90.

For example, when the device 100 receives a user input touching the next field displaying portion 420 in the on-screen keyboard 90, illustrated in FIG. 4A, the device 100 may determine an input field corresponding to a field name displayed on the next field displaying portion 410, as a second input field in which text data is to be input via the on-screen keyboard 90.

Here, when the second input field is the input field of the drop-down format, the device 100 may display the drop-down interface object 610 on the on-screen keyboard 90. For example, the device 100 may display the drop-down interface object 610 on a portion of the on-screen keyboard 90, in which the text box 520 is displayed.

When receiving a user input touching the drop-down interface object 610, the device 100 may display a plurality of input field values which are pre-determined in correspondence to the second input field.

When receiving a touch input selecting one from among the plurality of input field values, the device 100 may display the selected input field value on the on-screen keyboard 90 or on the second input field.

Thus, even if the input field is of the drop-down format, the user may select on the on-screen keyboard 90 the field value with respect to the input field, without returning to the page 40. Although FIG. 6 illustrates the case in which the input field is of the drop-down format, the embodiment illustrated in FIG. 6 may also be applied to other interface formats in which the input field is of a radio button type.

Figure 7:
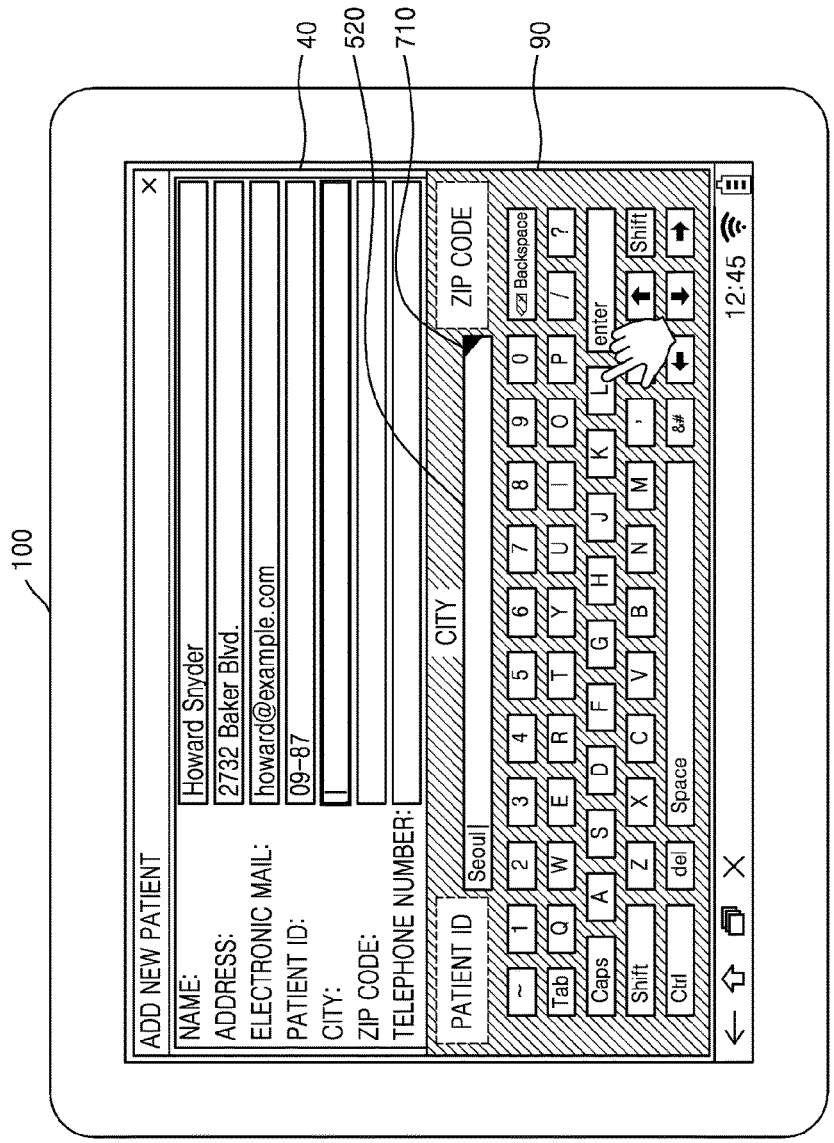
FIG. 7 is a view for describing a method of indicating on an on-screen keyboard whether a first input field is an input field corresponding to a pre-requisite item, via a device, according to an embodiment.

FIG. 7 is a view for describing a method of indicating on the on-screen keyboard 90 whether the first input field is an input field corresponding to a pre-requisite item, via the device 100, according to an embodiment.

Referring to FIG. 7, the device 100 may display on the on-screen keyboard 90 an image 710 indicating whether the first input field selected by a user is the input field corresponding to the pre-requisite item.

For example, the device 100 may display the image 710 indicating whether the first input field is an input field corresponding to a pre-requisite item, on the text box 520 in the on-screen keyboard 90.

Figure 8:
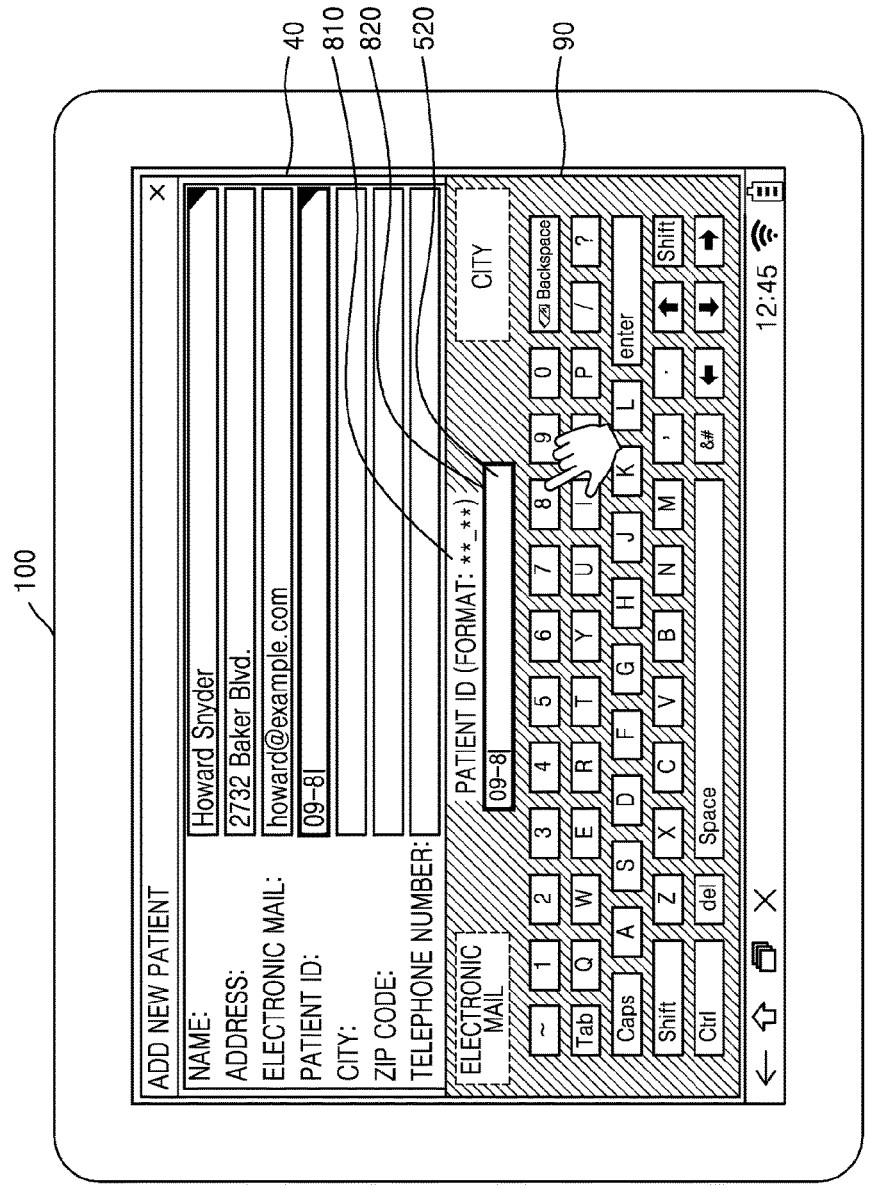
FIG. 8 is a view for describing a method of displaying an on-screen keyboard, via a device, when an input format is pre-determined in correspondence to an input field, according to an embodiment.

FIG. 8 is a view for describing a method of displaying the on-screen keyboard 90, via the device 100, when an input format is pre-determined in correspondence to an input field, according to an embodiment.

Referring to FIG. 8, when a format of text data which may be stored in correspondence to the first input field is pre-determined, the device 100 may display the format of text data corresponding to the first input field, on the on-screen keyboard 90.

For example, the format of text data which may be stored in correspondence to items may be pre-determined in the device 100. For example, the format of text data which may be stored, in correspondence to the item of patient ID may be a format in which four numbers are grouped in two with '-' therebetween. Accordingly, the device 100 may display a text 810 indicating the format of text data corresponding to the first input field, along with a field name of the first input field.

Also, when the format of text data which may be stored in correspondence to the first input field is pre-determined, the device 100 may display on the on-screen keyboard 90 whether the text data input by the user corresponds to the format of text data corresponding to the first input field.

For example, when receiving a user input touching a plurality of keys in the on-screen keyboard 90, the device 100 may determine whether the format of text data that is input corresponds to the format of text data corresponding to the first input field.

When the format of text data that is input does not correspond to the format of text data corresponding to the first input field, the device 100 may display an image 820 indicating that the format of text data that is input does not correspond to the format of text data corresponding to the first input field, on the on-screen keyboard 90. For example, the device 100 may change a frame line of the text box 520 as a red color.

When the format of text data that is input corresponds to the format of text data corresponding to the first input field, the device 100 may delete the image 820 indicating that the format of text data that is input does not correspond to the format of text data corresponding to the first input field. For example, the device 100 may change the frame line of the text box 520, whose color is changed as red, back to its original color.

Figure 9:
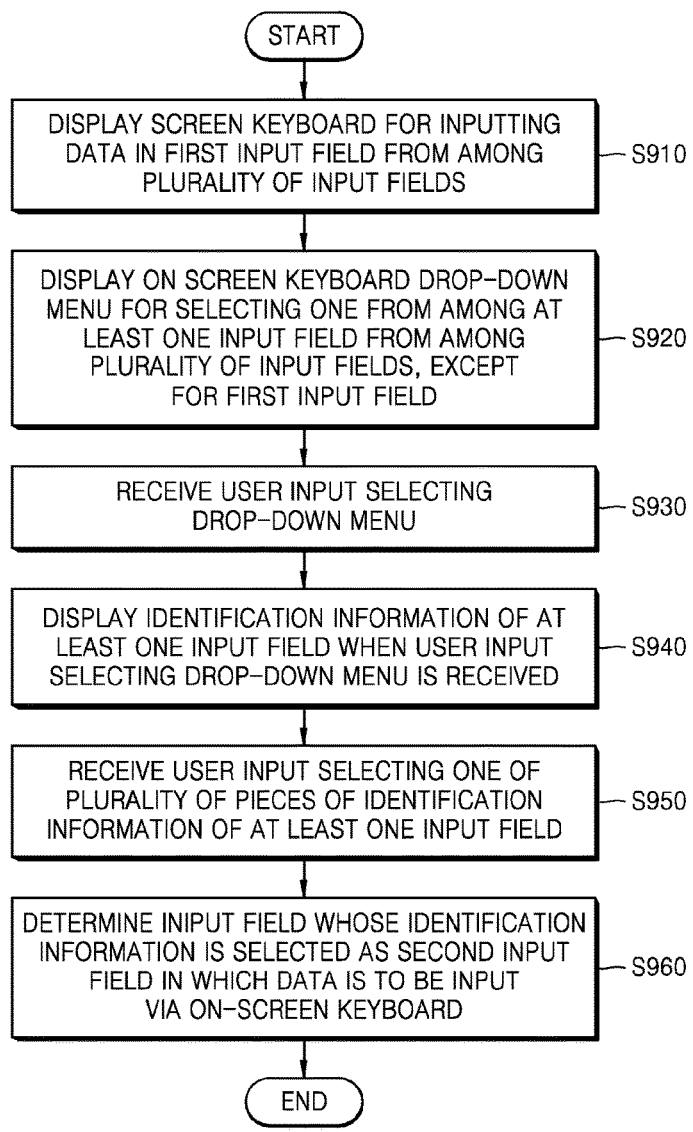
FIG. 9 is a flowchart illustrating a method of receiving a user input selecting an input field via a drop-down menu, according to an embodiment.

FIG. 9 is a flowchart illustrating a method of receiving a user input selecting an input field via a drop-down menu, according to an embodiment.

The device 100 may display an on-screen keyboard for inputting data in a first input field, from among a plurality of input fields, in operation S910.

For example, the device 100 may display a page including the plurality of input fields. Also, the device 100 may receive a user input selecting the first input field from among the plurality of input fields in the page. When receiving the user input selecting the first input field, the device 100 may display on the page the on-screen keyboard for inputting data in the first input field.

The device 100 may display on the on-screen keyboard a drop-down menu for selecting at least one input field from among the plurality of input fields, except for the first input field, in operation S920.

Also, the drop-down menu may include a previous field drop-down menu for selecting one from among input fields which are previous to the first input field and a next field drop-down menu for selecting one from among input fields which are next to the first input field.

Also, the drop-down menu may include an input completed drop-down menu for selecting one from among input fields whose field values are set and an input requiring drop-down menu for selecting one from among input fields whose field values are not set.

The device 100 may receive a user input selecting the drop-down menu, in operation S930.

When the user input selecting the drop-down menu is received, the device 100 may display identification information of the at least one input field, in operation S940.

For example, the device 100 may display identification information of the input fields from among the plurality of input fields, except for the first input field.

Also, when receiving a user input selecting the previous field drop-down menu, the device 100 may display identification information of the input fields from among the plurality of input fields, which are previous to the first input field. Also, when receiving a user input selecting the next field drop-down menu, the device 100 may display identification information of the input fields from among the plurality of input fields, which are next to the first input field.

Also, when receiving a user input selecting the input completed drop-down menu, the device 100 may display identification information of the input fields from among the plurality of input fields except for the first input field whose field value are set. Also, when receiving a user input selecting the input requiring drop-down menu, the device 100 may display identification information of the input fields from among the plurality of input fields except for the first input field whose field values are not set.

The device 100 may receive a user input selecting one of a plurality of pieces of identification information of the at least one input field, in operation S950.

The device 100 may determine the selected input field as a second input field in which data is to be input via the on-screen keyboard, in operation S960.

FIGS. 10A, 10B, 10C, and 10D are views for describing a method of receiving a user input selecting an input field via the drop-down menu, via the device 100, according to an embodiment.

Figure 10A:
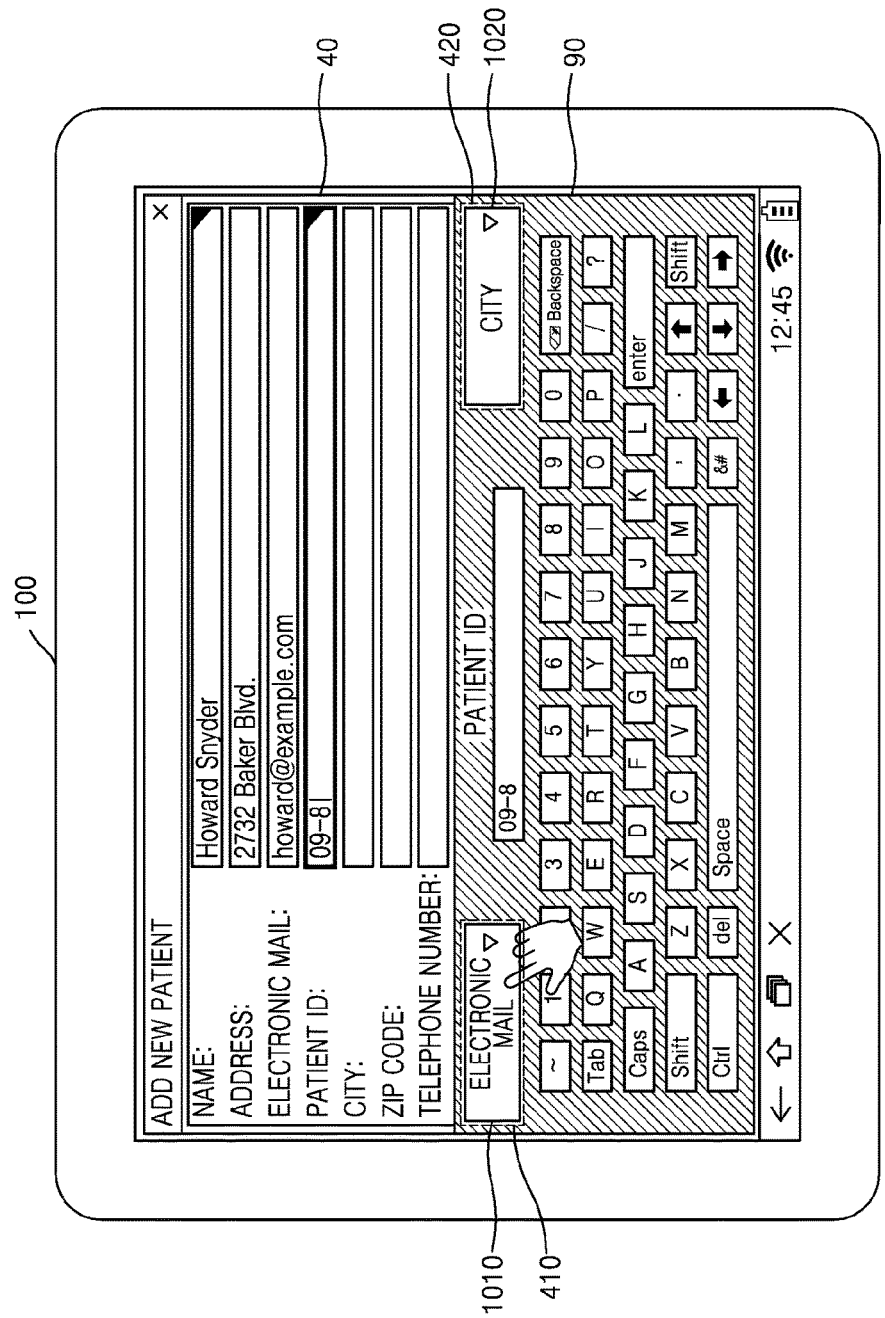
FIGS. 10A, 10B, 10C, and 10D are views for describing a method of receiving a user input selecting an input field via a drop-down menu, via a device, according to an embodiment.

Referring to FIG. 10A, the device 100 may display the drop-down menu for selecting an input field, on the on-screen keyboard 90.

The device 100 may determine the first input field in which text data is to be input via the on-screen keyboard 90. When the first input field is determined, the device 100 may determine input fields that are previous to the first input field. Also, the device 100 may determine input fields that are next to the first input field. An order of input fields may be determined according to a pre-determined order of items corresponding to the input fields. Also, the order of input fields may be determined according to display locations.

For example, when the item corresponding to the first input field is patient ID, the input fields that are previous to the first input field may be input fields corresponding to an item of an electronic mail, an item of an address, and an item of a name. Also, the input fields that are next to the first input field may be input fields corresponding to an item of a city, an item of a zip code, and an item of a telephone number.

When the previous input fields and the next input fields with respect to the first input field are determined, the device 100 may display at least one drop-down menu for selecting one from among the plurality of input fields, except for the first input field, on an input field information portion.

The device 100 may display on the on-screen keyboard 90 a previous field drop-down menu 1010 for selecting one from among the input fields that are previous to the first input field. Also, the device 100 may display on the on-screen keyboard 90 a next field drop-down menu 1020 for selecting one from among the input fields that are next to the first input field. For example, the device 100 may display the previous field drop-down menu 1010 on the previous field displaying portion 410 and may display the next field drop-down menu 1020 on the next field displaying portion 420.

The device 100 may display a field name of the previous input field of the first input field on the previous field drop-down menu 1010. Also, the device 100 may display a field name of the next input field of the first input field on the next field drop-down menu 1020.

When receiving a first user input (for example, a long touch or a double touch) with respect to the previous field drop-down menu 1010 or the next field drop-down menu 1020, the device 100 may drop down the previous field drop-down menu 1010 or the next field drop-down menu 1020. Also, when receiving a second user input (for example, a one-time touch) with respect to the previous field drop-down menu 1010 or the next field drop-down menu 1020, the device 100 may determine a input field corresponding to a field name displayed on the selected drop-down menu as the second input field. For example, when receiving a one-time touch with respect to the previous field drop-down menu 1010, the device 100 may determine the input field corresponding to "electronic mail" as a input field in which text data is to be input via the on-screen keyboard 90.

Figure 10B:
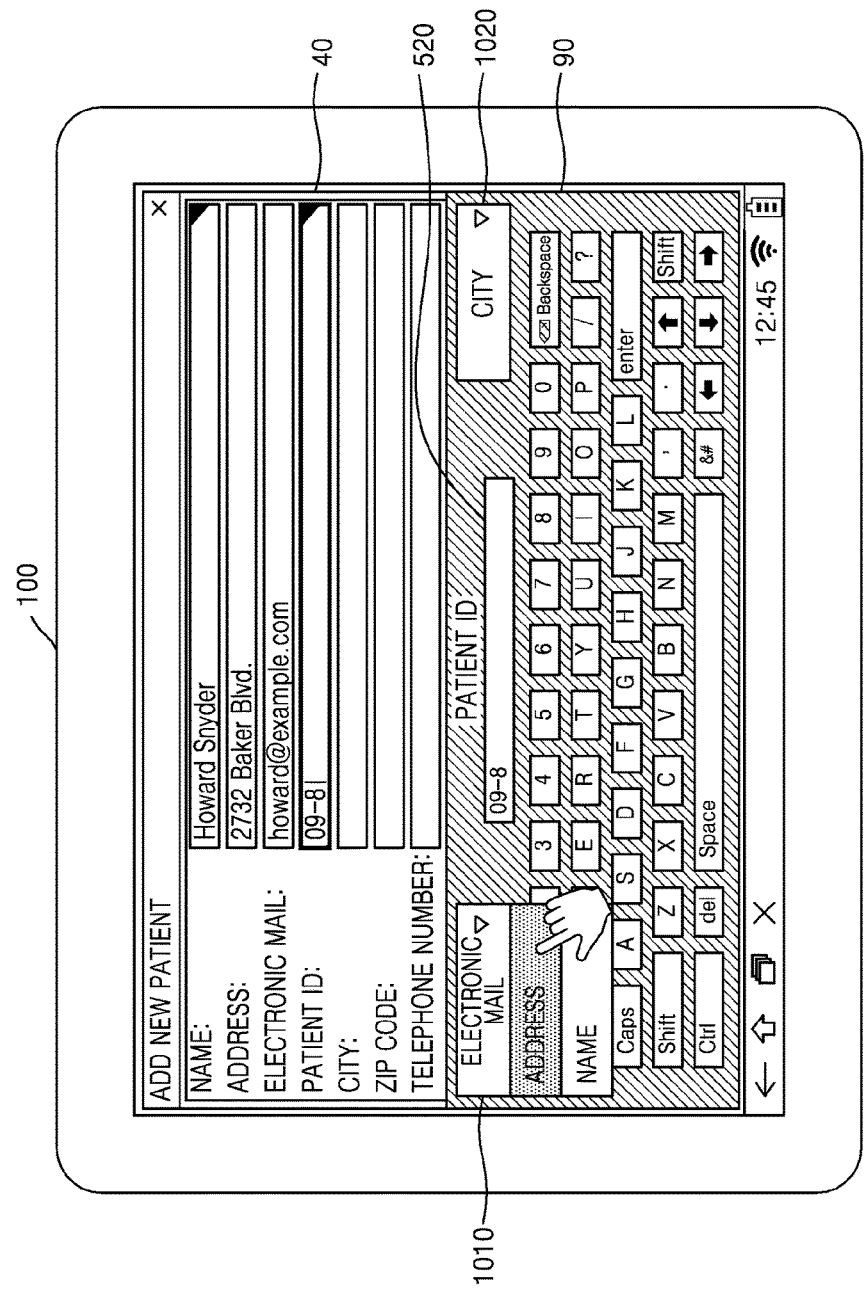

Referring to FIG. 10B, when receiving a user input selecting the previous field drop-down menu 1010, the device 100 may display field names of a plurality of input fields which may be selected by the previous field drop-down menu 1010. The user input selecting the previous field drop-down menu 1010 may be a long touch or a double touch with respect to the previous field drop-down menu 1010.

When the device 100 receives a user input selecting one from among field names of the plurality of input fields which may be selected via the previous field drop-down menu 1010, the device 100 may determine an input field corresponding to the selected field name, as a second input field in which text data is to be input via the on-screen keyboard 90.

For example, if the input fields which may be selected via the previous field drop-down menu 1010 are input fields corresponding to the item of the electronic mail, the item of the address, and the item of the name, when receiving a user input long touching the previous field drop-down menu 1010, the device 100 may display "electronic mail," "address," and "name," which are the field names of the items of the electronic mail, the address, and the name. When the device 100 receives a user input selecting "address," the device 100 may determine the input field corresponding to the item of the address, as the second input field.

Also, when receiving the user input selecting the previous field drop-down menu 1010, the device 100 may store a key value displayed on the text box 520 as a field value of the first input field.

Figure 10C:
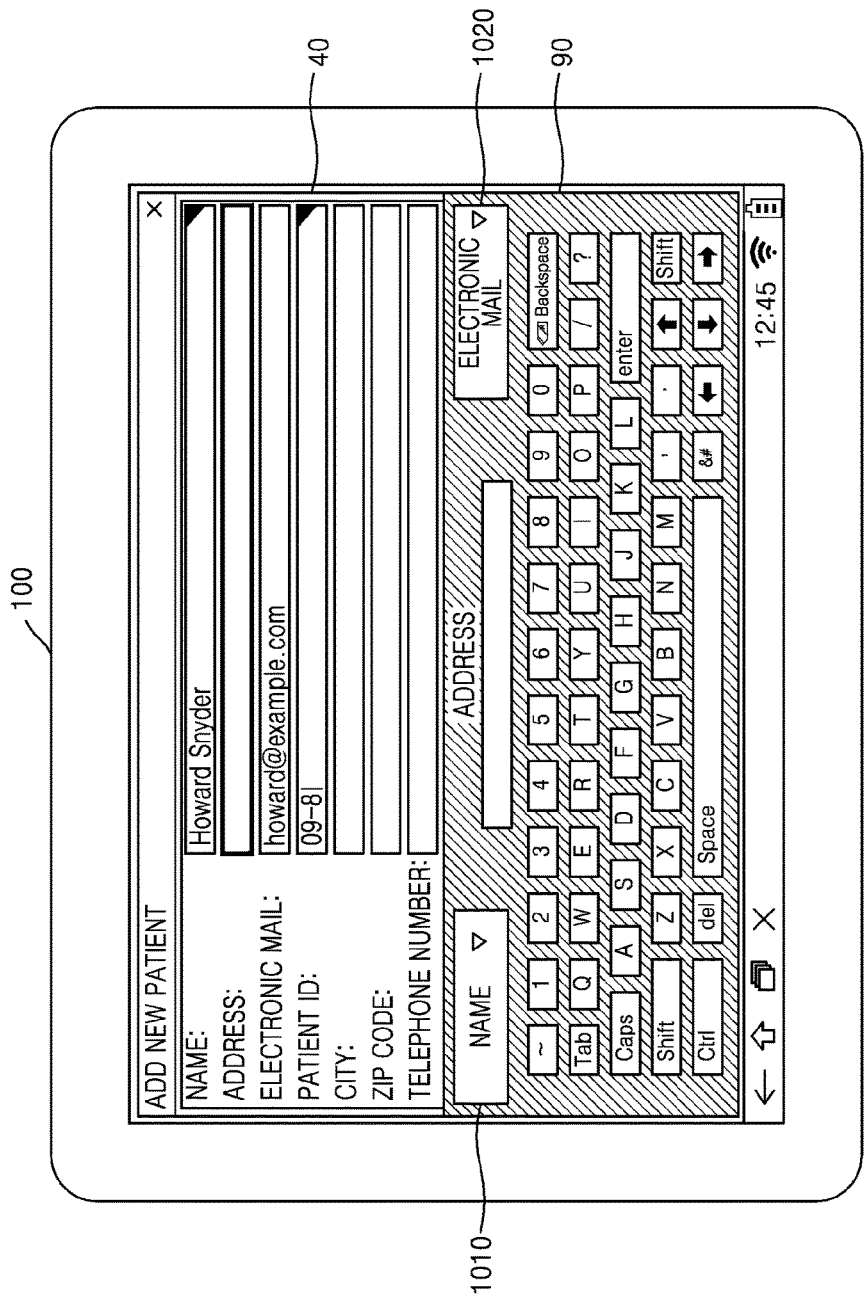

Referring to FIG. 10C, when the second input field is determined, the device 100 may display a field name of the previous input field of the second input field and a field name of the next input field of the second input field.

When the second input field is determined, the device 100 may display a field name of the second input field. Also, when the second input field is determined, the device 100 may display the field name of the previous input field of the second input field, on the previous field drop-down menu 1010. Also, the device 100 may display the field name of the next input field of the second input field, on the next field drop-down menu 1020.

For example, when the input field corresponding to "address" is determined as the second input field, the device 10 may display "name" that is the field name of the previous input field of the second input field on the previous field drop-down menu 1010, and may display "electronic mail" that is the field name of the next input field of the second input field on the next field drop-down menu 1020.

Figure 10D:
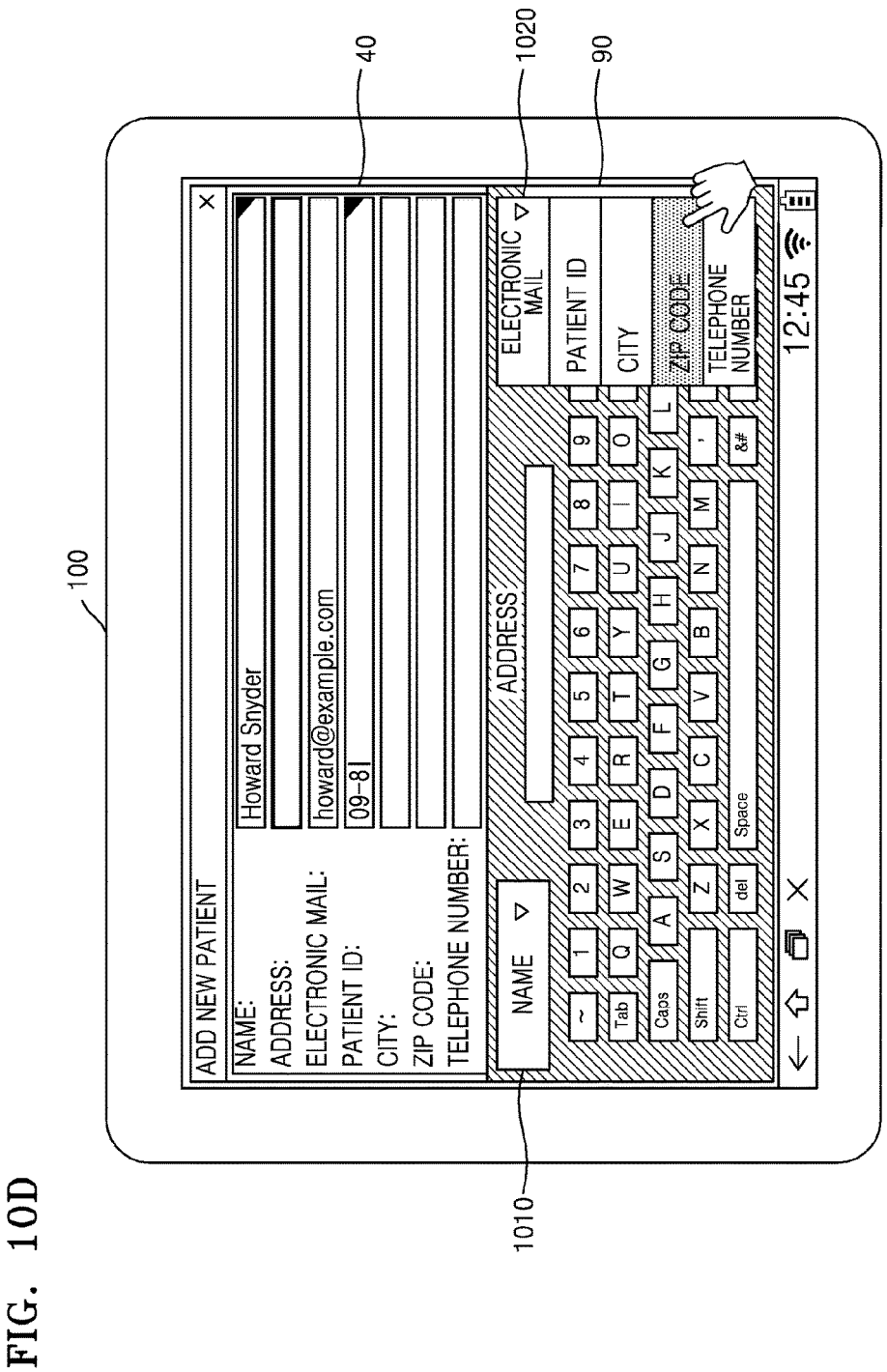

Referring to FIG. 10D, when receiving a user input selecting the next field drop-down menu 1020, the device 100 may display field names of a plurality of input fields which may be selected via the next field drop-down menu 1020.

For example, when the second input field in which text data is to be input via the on-screen keyboard 90 is an input field of the item of the address, the plurality of input fields which may be selected via the next field drop-down menu 1020 may be input fields corresponding to the item of the electronic mail, the item of the patient ID, the item of the zip code, and the item of the telephone number. When receiving the user input selecting the next field drop-down menu 1020, the device 100 may display "electronic mail," "patient ID," "city," "zip code," and "telephone number," which are the field names of the items of the electronic mail, the patient ID, the zip code, and the telephone number.

When receiving a user input selecting one from among the field names of the plurality of input fields which may be selected via the next field drop-down menu 910, the device 100 may determine an input field corresponding to the selected field name, as a third input field in which text data is to be input via the on-screen keyboard 90.

Figure 10E:
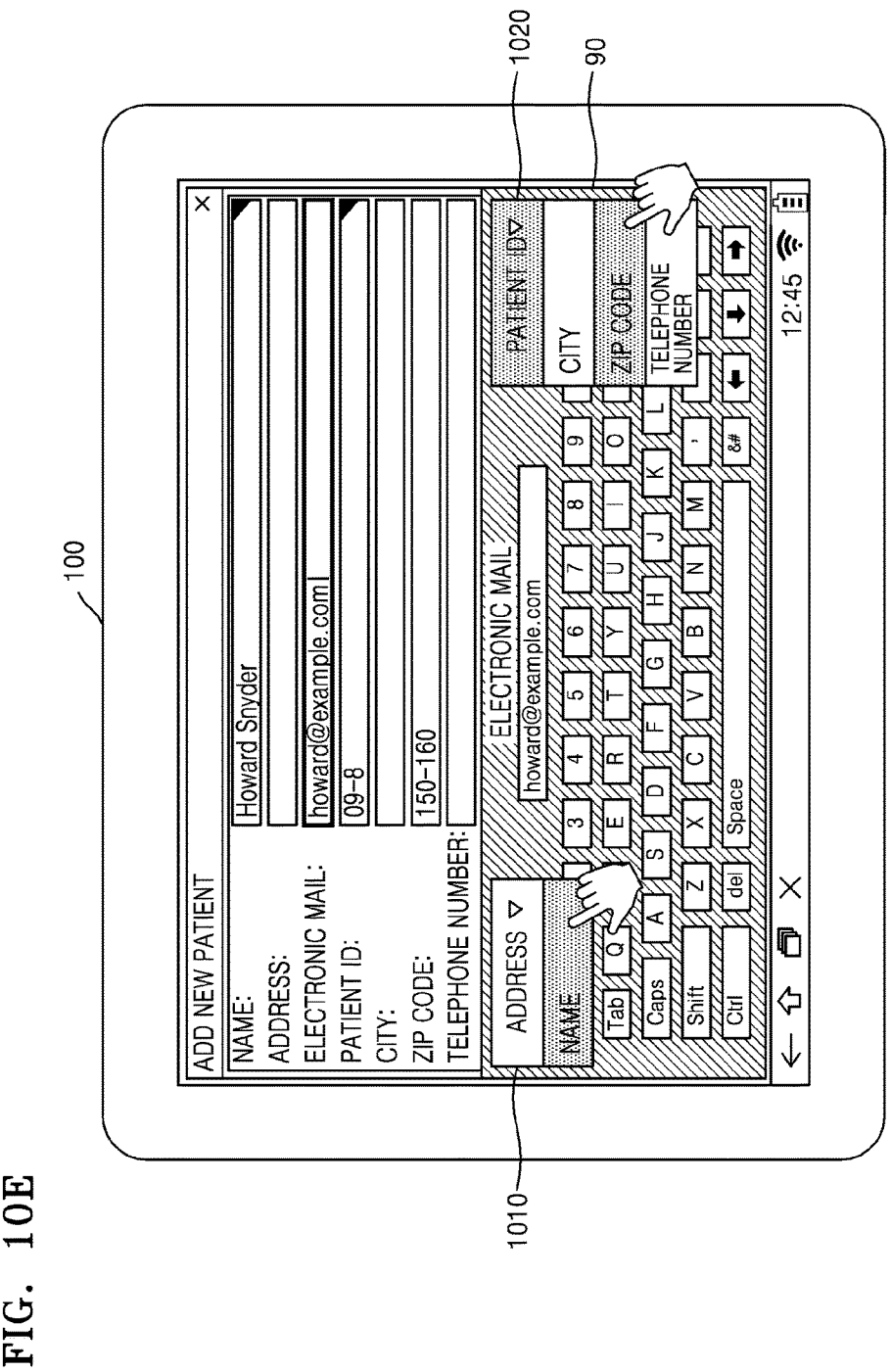
FIG. 10E is a view for describing a method of indicating on an on-screen keyboard whether a field value of an input field is input, via a device, according to an embodiment.

FIG. 10E is a view for describing a method of indicating on the on-screen keyboard whether a field value of an input field is input or not, via the device 100, according to an embodiment. Referring to FIG. 10E, the device 100 may display input fields such that input fields whose field values are input are distinguished from input fields whose field values are not input.

For example, among the items of the name, the address, the electronic mail, the patient ID, the city, the zip code, and the telephone number, it may be assumed that field values may be input in the input fields corresponding to the items of the name, the electronic mail, the patient ID, and the zip code, and field values may not be input in the input fields corresponding to the items of the address, the city, and the telephone number.

When the input field in which text data is to be input via the on-screen keyboard 90 is the input field of the item of the electronic mail, the device 100 may display identification information of the input fields of the items of the address and the name, which are the previous input fields with respect to the input field of the item of the electronic mail, on a previous field drop-down menu 1010. Also, the device 100 may display identification information of the input fields of the items of the patient ID, the city, the zip code, and the telephone number, which are the next input fields with respect to the input field of the item of the electronic mail, on a next field drop-down menu 1020.

In this case, the identification information of the input fields of the items of the name, the electronic mail, the patient ID, and the zip code, in which field values are input, may be displayed to be distinguished from the identification information of the input fields of the items of the address, the city, and the telephone number. For example, the device 100 may display the identification information of the input fields in which field values are not input, more apparently than the identification information of the input fields in which field values are input.

Figure 11:
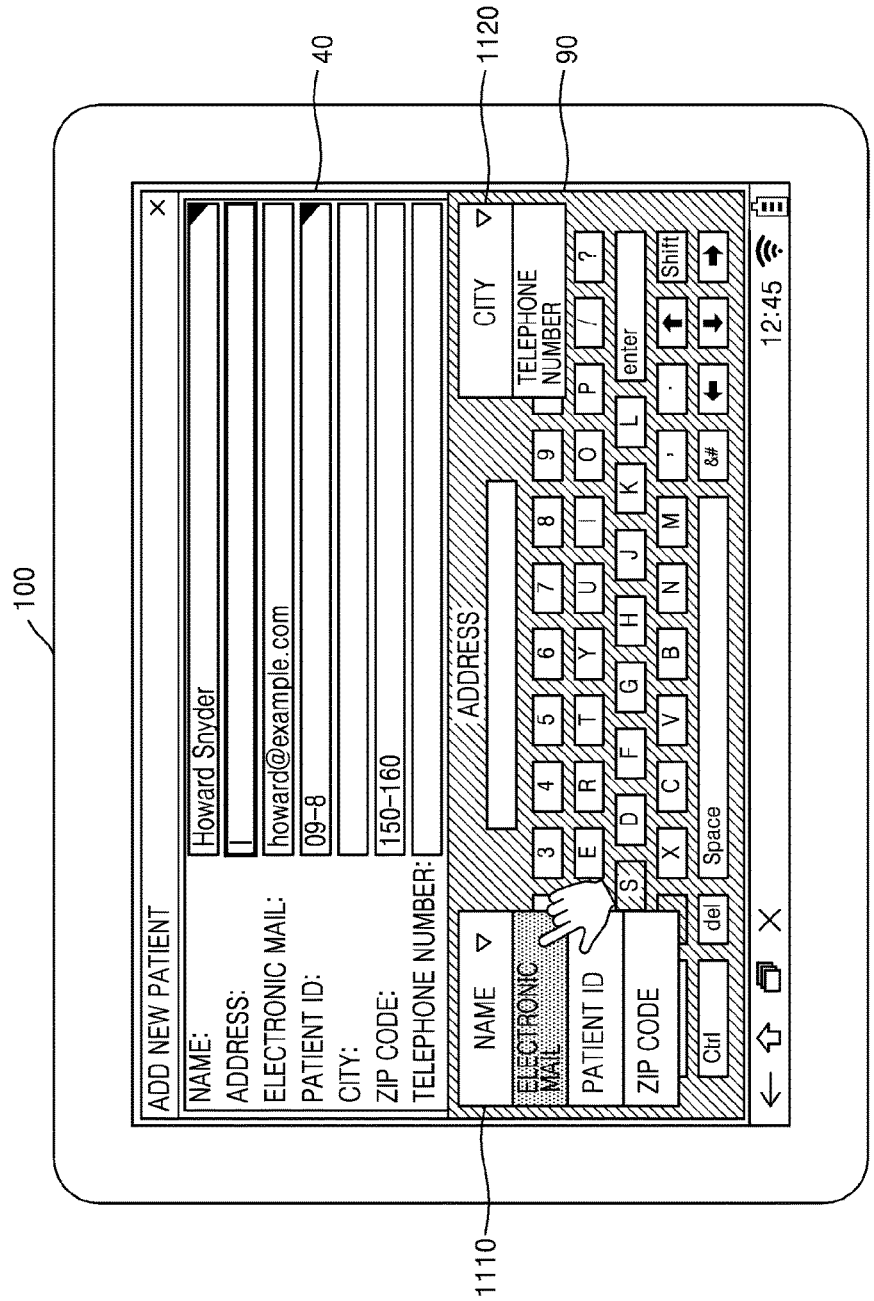
FIG. 11 is a view for describing a method of receiving a user input selecting an input field via a drop-down menu, via a device, according to another embodiment.

FIG. 11 is a view for describing a method of receiving a user input selecting an input field via a drop-down menu, via the device 100, according to another embodiment.

Referring to FIG. 11, the device 100 may display the drop-down menu for selecting one of input fields in which field values are input and the drop-down menu for selecting one of input fields in which field values are not input.

The device 100 may display first drop-down menu 1110 for selecting one from among the input fields in which field values have been input, except for a first input field in which text data is to be input via the on-screen keyboard 90. Also, the device 100 may display second drop-down menu 1120 for selecting one from among the input fields in which field values have not been input, except for the first input field in which text data is to be input via the on-screen keyboard 90.

For example, when the first input field is an input field corresponding to an item of an address, and from among a plurality of input fields in the page 40, the input fields in which field values are input are input fields corresponding to items of the name, an electronic mail, and a zip code, and the input fields in which field values are not input are input fields corresponding to items of a city and a telephone number, the device 100 may display the first drop-down menu 1110 for selecting one from among the input fields corresponding to the items of the name, the electronic mail, and the zip code, and may display the second drop-down menu 1120 for selecting one from among the input fields corresponding to the items of the city and the telephone number.

Figure 12:
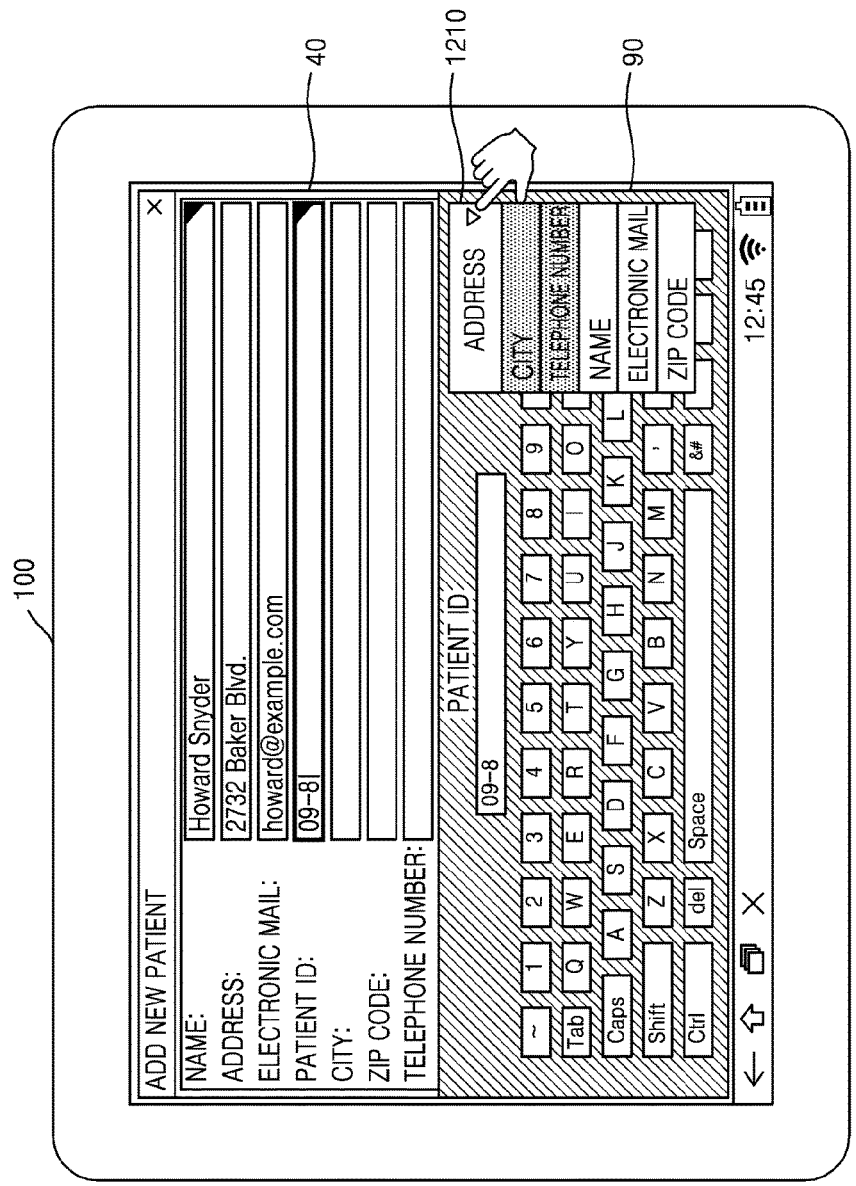
FIG. 12 is a view for describing a method of receiving a user input selecting an input field via a drop-down menu, via a device, according to another embodiment.

FIG. 12 is a view for describing a method of receiving a user input selecting an input field via a drop-down menu, via the device 100, according to another embodiment.

Referring to FIG. 12, the device 100 may display one drop-down menu by distinguishing input fields in which field values are input from input fields in which field values are not input.

The device 100 may display the drop-down menu 1210 for selecting one from among a plurality of input fields in the page 40, except for the first input field in which text data is to be input via the on-screen keyboard 90. In this case, when the device 100 receives a user input selecting the drop-down menu 1210, the device 100 may display field names of the input fields in which field values are not input above and may display field names of the input fields in which field values are input below.

For example, when receiving the user input selecting the drop-down menu 1210, the device 100 may display the input fields from among the plurality of input fields in the page 40, in which field values are not input, that is, input fields corresponding to the items of the address, the city, and the telephone number above, and may display the input fields from among the plurality of input fields in the page 40, in which field values are input, that is, input fields corresponding to the items of the name, the electronic mail, and the zip code, below.

Also, the device 100 may display the field names of the input fields in which field values are input and the field names of the input fields in which field values are not input, as different colors.

Figure 13:
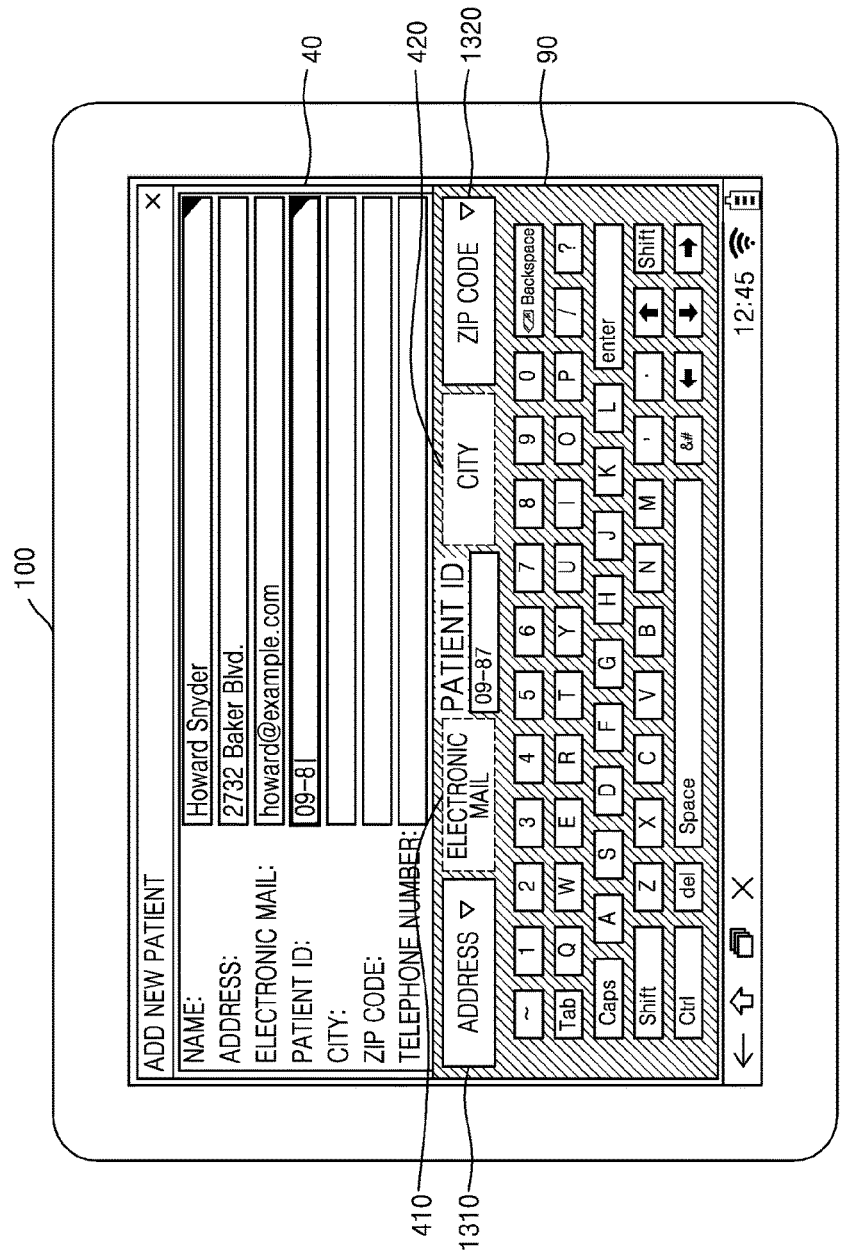
FIG. 13 is a view for describing a method of receiving a user input selecting an input field via a drop-down menu, via a device, according to another embodiment.

FIG. 13 is a view for describing a method of receiving a user input selecting an input field via a drop-down menu, via the device 100, according to another embodiment.

Referring to FIG. 13, the device 100 may display a drop-down menu for selecting one from among a plurality of input fields, along with identification information of a previous input field and a next input field of a first input field in which text data is to be input via the on-screen keyboard 90.

For example, the device 100 may display a field name of the previous input field of the first input field on the previous field displaying portion 410. Also, the device 100 may display a field name of the next input field of the first input field on the next field displaying portion 420. Also, the device 100 may display a drop-down menu 1310 for selecting one from among input fields that are previous to the previous input field of the first input field. Also, the device 100 may display a drop-down menu 1320 for selecting one from among input fields that are next to the next input field of the first input field.

Figure 14A:
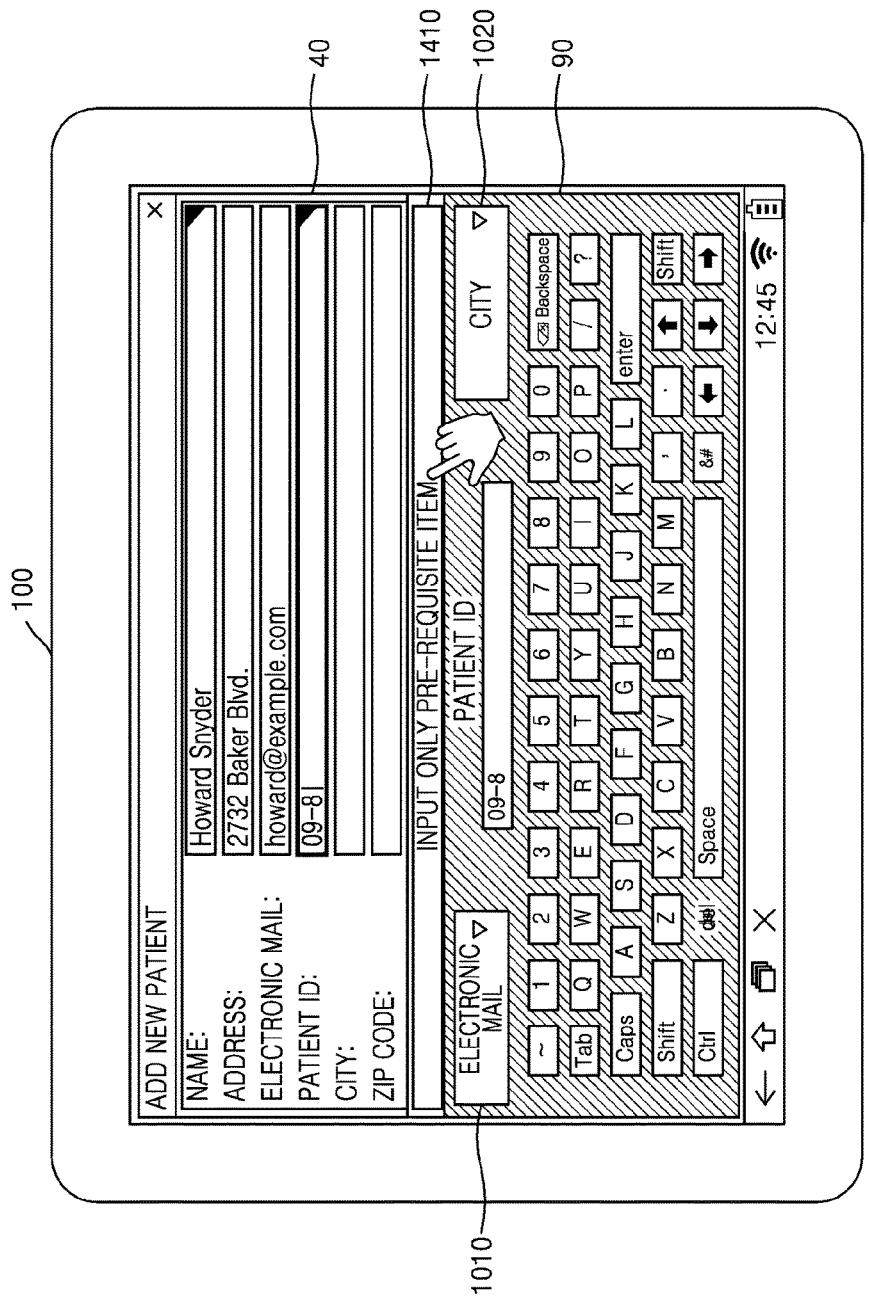
FIGS. 14A and 14B are views for describing a method of providing an interface through which a device can select only input fields corresponding to pre-requisite items via a drop-down menu, according to an embodiment.
Figure 14B:
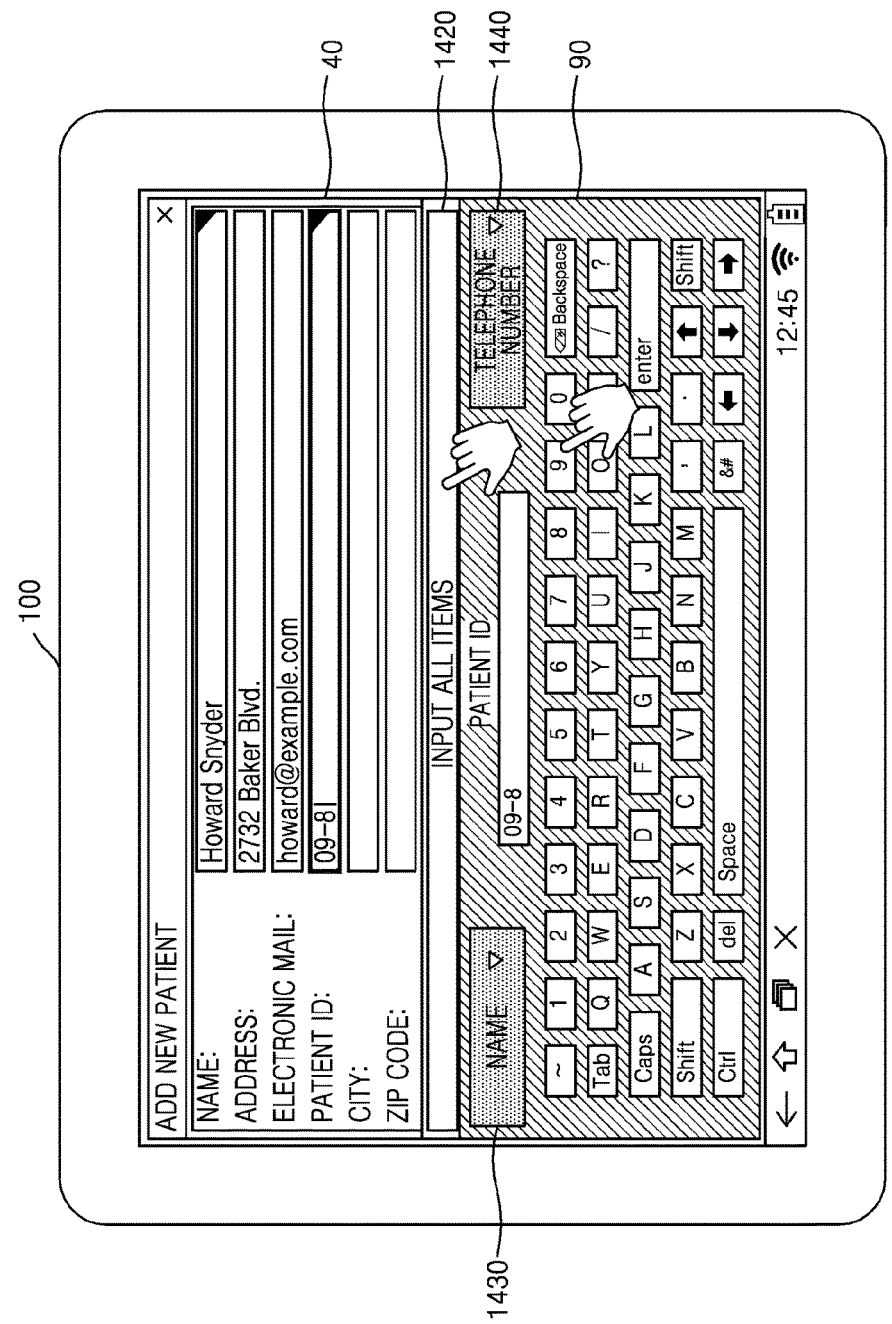

FIGS. 14A and 14B are views for describing a method of providing an interface through which the device 100 may select only input fields corresponding to pre-requisite items via a drop-down menu, according to an embodiment.

Referring to FIG. 14A, the device 100 may display interface objects 1010 and 1020 for selecting one from among a plurality of input fields, except for a first input field in which text data is to be input via the on-screen keyboard 90, and a pre-requisite item button 1410 for changing the interface objects 1010 and 1020 as interface objects 1410 and 1420 for selecting one from among only the input fields corresponding to the pre-requisite items. The interface objects may include a button or a drop-down menu.

Referring to FIG. 14B, when the device 100 receives a user input touching the pre-requisite item button 1410, the device 100 may change the interface objects 1010 and 1020 for selecting one from among the plurality of input fields, except for the first input field, as the interface objects 1410 and 1420 for selecting one from among the input fields corresponding to the pre-requisite items.

For example, when receiving the user input touching the pre-requisite item button 1410, the device 100 may display a drop-down menu 1430 for selecting one of input fields corresponding to pre-requisite items from among previous input fields of the first input field. Also, the device 10 may display a drop-down menu 1440 for selecting one of input fields corresponding to pre-requisite items from among next input fields of the first input field.

For example, when the pre-requisite items from among the plurality of input fields in the page 40 are items of a name, patient ID, and a telephone number, the device 100 may display the interface objects 1410 and 1420 for selecting one from among the input fields corresponding to the items of the name and the telephone number, except for the input field corresponding to the patient ID, which is the first input field.

Also, the device 100 may display a button 1420 for displaying the interface objects 1010 and 1020 for selecting again one from among the plurality of input fields in the page 40.

Figure 15:
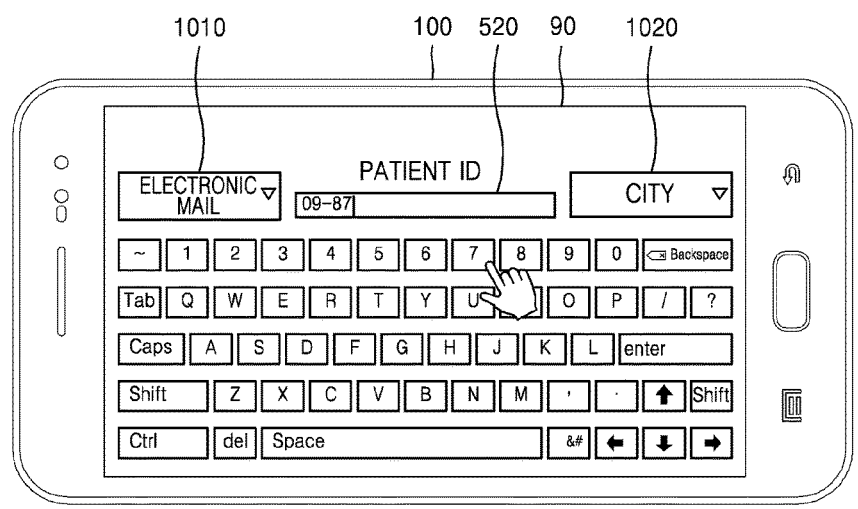
FIG. 15 is a view for describing a method of displaying an on-screen keyboard, via a device, according to an embodiment.

FIG. 15 is a view for describing a method of displaying the on-screen keyboard 90, via the device 100, according to an embodiment.

Referring to FIG. 15, the device 100 may display the on-screen keyboard 90 throughout a screen. Also, when a plurality of input fields are displayed on a portion of the entire screen, the device 100 may display the on-screen keyboard 90 on the portion on which the plurality of input fields are displayed.

For example, when receiving a user input touching an input field corresponding to an item of patient ID from among the input fields 50 illustrated in FIG. 2A, the device 10 may determine the input field corresponding to the item of the patient ID as a first input field in which text data is to be input via the on-screen keyboard 90. Also, the device 100 may display the on-screen keyboard 90 for inputting text data in the first input field.

Also, the device 100 may display on the on-screen keyboard 90 a field name of the first input field and the text box 520. For example, the device 100 may display "patient ID" that is the field name of the first input field, together with the text box 520.

Also, the device 100 may display a field name of a previous input field of the first input field on the previous field displaying portion 410 of the on-screen keyboard 90, and a field name of a next input field of the first input field on the next field displaying portion 420 of the on-screen keyboard 90. For example, the device may display "electronic mail" that is the field name of the previous input field of the first input field on the previous field displaying portion 410 of the on-screen keyboard 90 and may display "city" that is the field name of the next input field of the first input field on the next field displaying portion 420.

Also, when the item corresponding to the first input field is a pre-requisite item, the device 100 may display on the text box 520 an image 710 indicating that the input field is an input field corresponding to a pre-requisite item.

Also, when the device 100 receives a user input touching a plurality of keys in the on-screen keyboard 90, the device 100 may display on the text box 520 key values of the series of keys that are touched.

Also, when the device receives a user input touching one of the previous field displaying portion 410 and the next field displaying portion 420, the device 100 may determine an input field corresponding to the touched portion as a second input field in which text data is to be input via the on-screen keyboard 90. Also, the device 100 may display a previous input field of the second input field on the previous field displaying portion 410 and may display a next input field of the second input field on the next field displaying portion 420.

Accordingly, the user may input field values in the input fields by maximizing the on-screen keyboard 520, without looking at all the page in which the input fields are included.

Figure 16B:
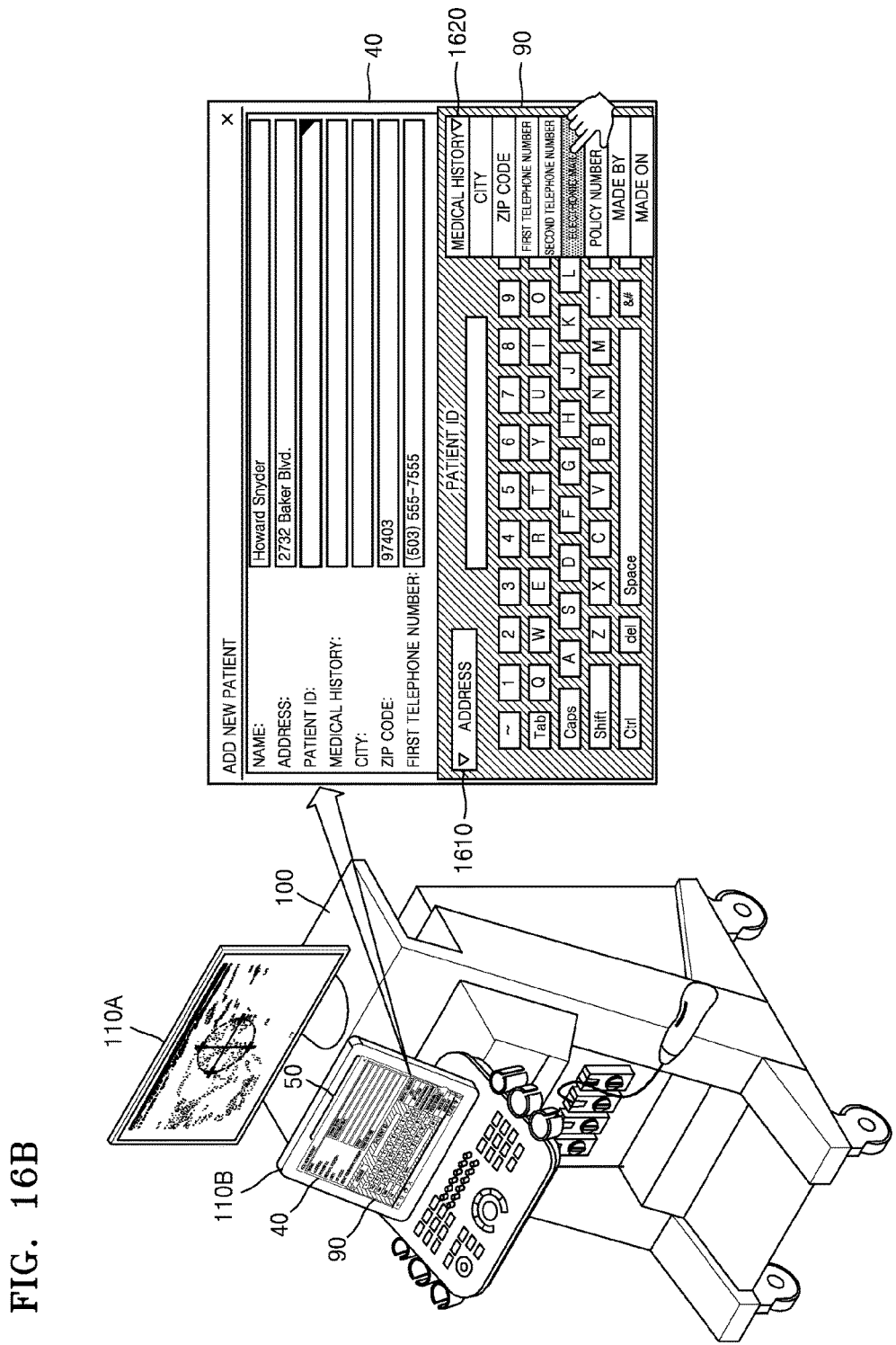
Figure 16C:
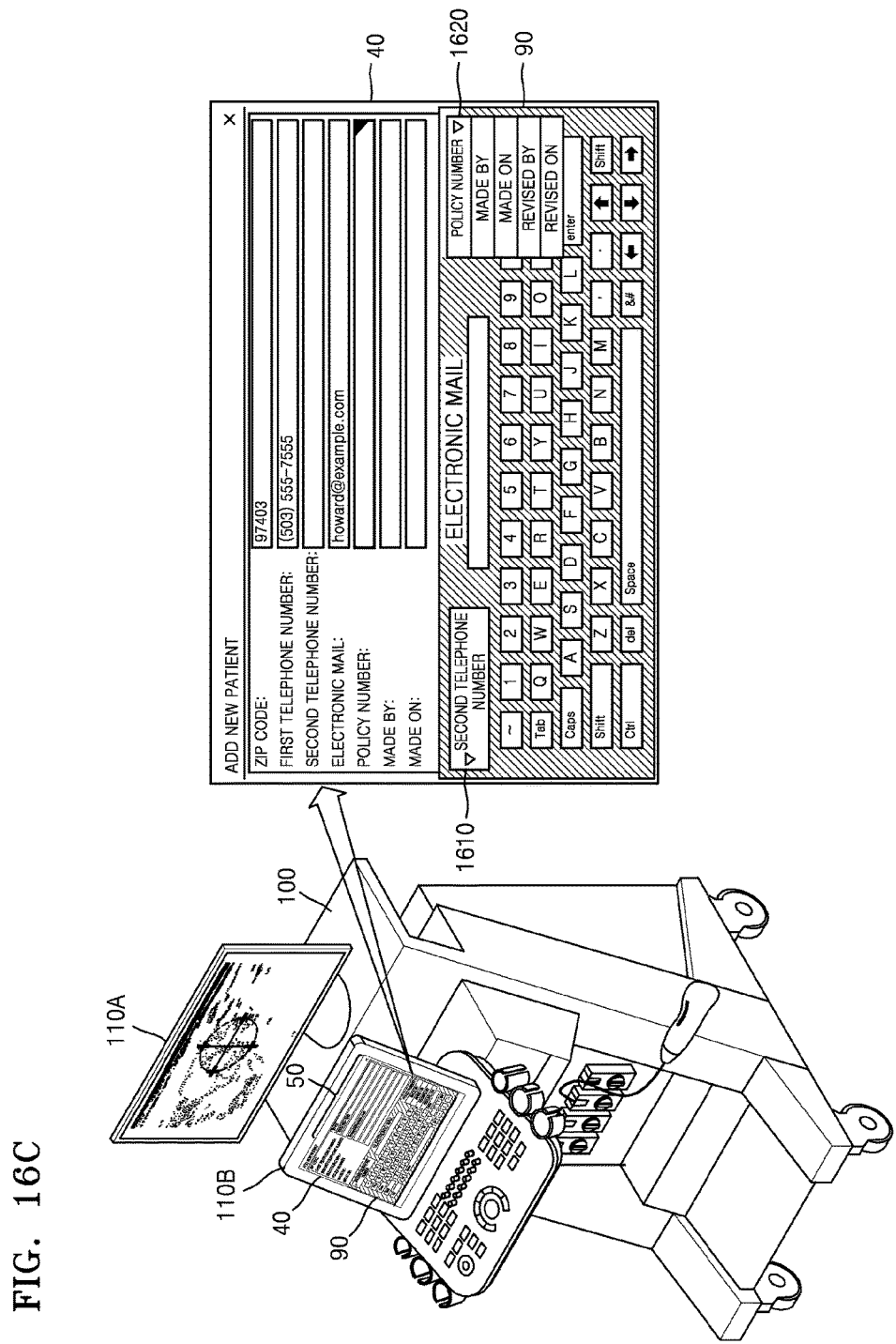

FIGS. 16A through 16C are views for describing a method of moving a display location of the page 40, via the device 100, when input fields in which text data is to be input are changed on the on-screen keyboard 90.

Referring to FIG. 16A, the device 100 may display the page 40 for adding new patients on a screen of the sub-display unit 110B. The page 40 for adding new patients may include a plurality of input fields.

Referring to FIG. 16B, when receiving a user input selecting an input field corresponding to an item of patient ID from among the plurality of input fields, the device 100 may display the on-screen keyboard 90 on the page 40. In this case, the device 100 may display on the on-screen keyboard 90 a field name of the item of the patient ID that is selected by the user.

Also, the device 100 may display on the on-screen keyboard 90 a drop-down menu 1610 for selecting one from among previous items, with respect to the item of the patient ID, and a drop-down menu 1620 for selecting one from among next items, with respect to the item of the patient ID.

Also, when receiving a user input selecting the drop-down menu 1620 for selecting one from among the next items of the item of the patient ID, the device 100 may display a list of the next items of the item of the patient ID. Accordingly, the user may also select an input field in the page 40, which is hidden by the on-screen keyboard 90, when the on-screen keyboard 90 is displayed on the page 40. For example, the device 100 may receive a user input selecting an electronic mail from the list of the next items of the item of the patient ID.

Referring to FIG. 16C, when the device receives the user input selecting the item of the electronic mail from the list of the next items of the item of the patient ID, the device 100 may move the display location of the page 40. For example, when receiving the user input selecting the item of the electronic mail from the drop-down menu 1620, the device 100 may move a bottom portion of the page 40 to an upper portion of the screen so that the input field corresponding to the item of the electronic mail is not hidden by the on-screen keyboard 90.

Accordingly, the user may select on the on-screen keyboard 90 the input field in which text data is to be input without touching the page 40, and may identify the location of the current input field on the page 40.

Figure 17:
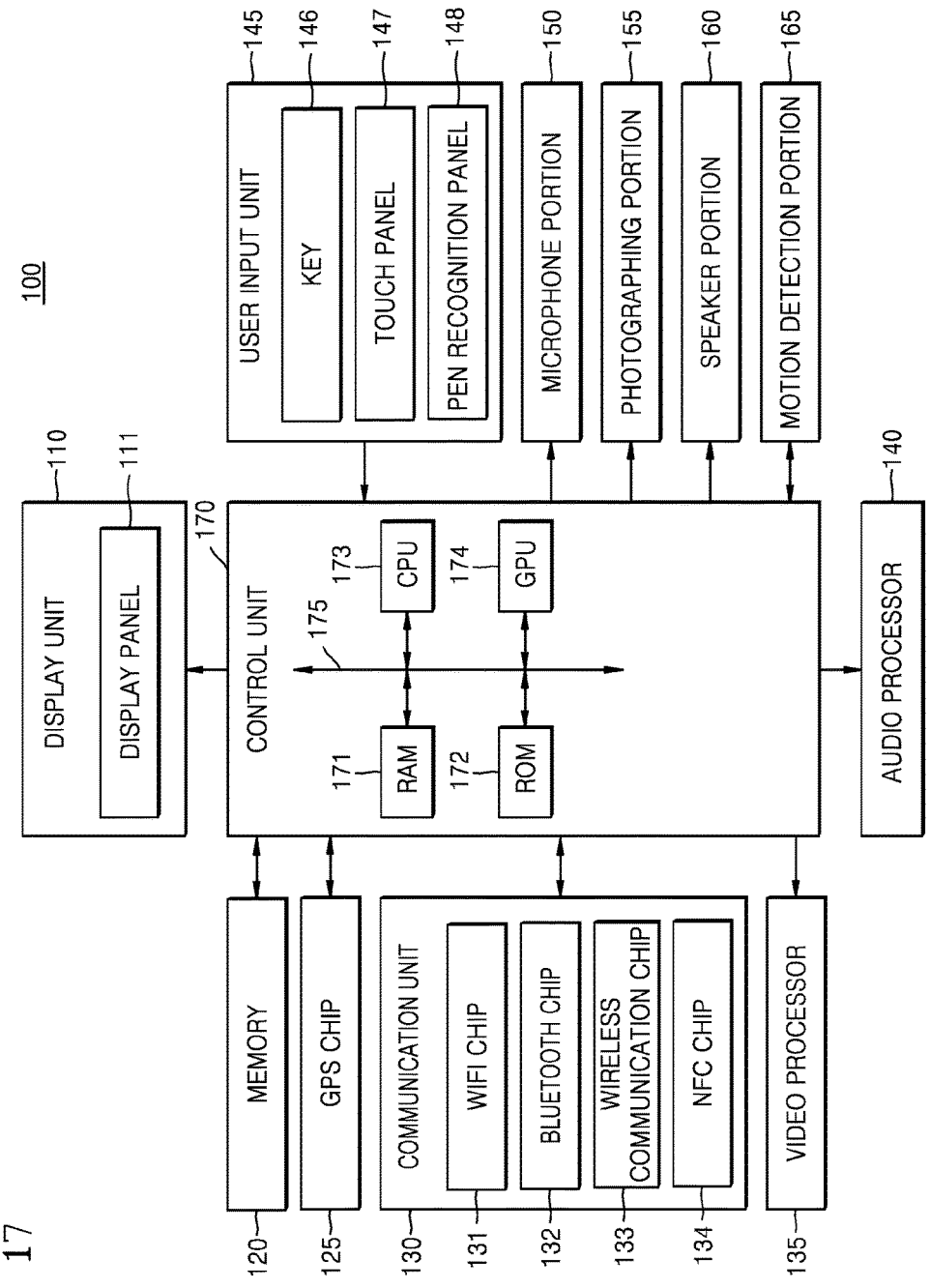
FIG. 17 is a block diagram of a device, according to another embodiment.

FIG. 17 is a block diagram of the device 100, according to another embodiment.

As illustrated in FIG. 17, the device 100 may be implemented in various types of apparatuses, such as wearable devices 100, such as cellular phones, tablet PCs, personal digital assistants (PDAs), MP3 players, kiosks, electronic frames, navigation devices, digital televisions (TVs), wrist watches, or head-mounted displays (HMD). Also, the device 100 may be implemented in an ultrasound apparatus.

Referring to FIG. 17, the device 100 may include at least one selected from a memory 120, a GPS chip 125, a communication unit 130, a video processor 135, an audio processor 140, a microphone portion 150, a photographing portion 155, a speaker portion 160, and a motion detecting portion 165, in addition to the display unit 110, the control unit 170, and the user input unit 145 illustrated in FIG. 1.

The display unit 110 may display a screen board including at least one drop-down menu for selecting one from among a plurality of input fields, except for a first input field, when a user input selecting the first input field from among the plurality of input fields in the page is received.

Also, the display unit 110 may display a field name of at least one input field corresponding to the selected drop-down menu, from among the plurality of input fields, when a user input selecting one from among the at least one drop-down menu in the on-screen keyboard is received.

Also, the display unit 110 may display the at least one input field such that input fields whose field values are set from among the at least one input field corresponding to the selected drop-down menu are distinguished from input fields whose field values are not set.

The user input unit 145 may receive a user input selecting one from among the at least one drop-down menu in the on-screen keyboard.

Also, the user input unit 145 may receive a user input selecting one from among field names of the at least one input field included in the drop-down menu.

When a user input selecting one from among the field names of the at least one input field in the drop-down menu is received, the control unit 170 may determine an input field corresponding to the field name as a third input field in which data is to be input via the on-screen keyboard.

Also, the control unit 170 may store a key value of at least one key displayed on the text box in the on-screen keyboard as a field value of the first input field.

Also, the display unit 110 may include a display panel 111 and a controller (not shown) for controlling the display panel 111. The display panel 111 may be realized as various types of displays, such as liquid crystal displays (LCD), organic light-emitting diodes (OLED), active-matrix organic light-emitting diodes (AM-OLED), and plasma display panels (PDP). The display panel 111 may be realized to be flexible, transparent, and wearable. The display unit 110 may be combined with a touch panel 147 of the user input unit 145 to be provided as a touch screen (not shown). For example, the touch screen may include an integral module in which the display panel 111 and the touch panel 147 are stacked.

The memory 120 may include at least one of an internal memory (not shown) and an external memory (not shown).

The internal memory may include at least one selected from, for example, volatile memories (for example, dynamic RAM (DRAM), static RAM (SRAM), and synchronous dynamic RMA (SDRAM), non-volatile memories (for example, one time programmable ROM (OTPROM), programmable ROM (PROM), erasable and programmable ROM (EPROM), electrically erasable and programmable ROM (EEPROM), mask ROM, and flash ROM), hard disk drive (HDD), and solid state drive (SSD). According to an embodiment, the control unit 170 may process a command or data received from the non-volatile memory or from at least one of other components by loading the command or the data in the volatile memory. Also, the control unit 170 may retain the data received or generated from other components in the non-volatile memory.

The external memories may include at least one selected from, for example, compact flash (CF), secure digital (SD), micro secure digital (Micro-SD), mini secure digital (Mini-SD), extreme digital (xD), and memory stick.

The memory 120 may store various programs and data used for an operation of the device 100.

The control unit 170 may control the display unit 110 such that a portion of the content stored in the memory 120 is displayed in the display unit 110. In other words, the control unit 170 may display a portion of the content stored in the memory 120 in the display unit 110. Alternatively, the control unit 170 may perform a control operation corresponding to a user's gesture, when the user's gesture is generated in a portion of the display unit 110.

The control unit 170 may include at least one selected from RAM 171, ROM 172, a CPU 173, a graphic processing unit (GPU) 174, and a bus 175. The RAM 171, the ROM 172, the CPU 173, and the GPU 174 may be connected with one another via the bus 175.

The CPU 173 accesses the memory 120 and performs a boot operation by using O/S stored in the memory 120. Also, the CPU 173 performs various operations by using various programs, content, and data stored in the memory 120.

A set of command languages for a system boot operation is stored in the ROM 172. For example, when a turn-on command is input in a portable terminal 100 and a power is supplied, the CPU 173 may copy the O/S stored in the memory 120 in the RAM 171, according to the command language stored in the ROM 172, and may execute the O/S to boot the system. When the booting is completed, the CPU 173 may copy various programs stored in the memory 120 in the RAM 171 and execute the programs copied in the RAM 171 to perform various operations. The GPU 174 displays a UI screen on a portion of the display unit 110, when the booting of the device 100 is completed. In detail, the GPU 174 may generate a screen in which electronic files including various objects, such as content, icons, and menus are displayed. The GPU 174 may calculate feature values, such as coordinate values, shapes, sizes, and colors of displayed objects in correspondence to a layout of the screen. Also, the GPU 174 may generate screens of various layouts including objects, based on the calculated feature values. The screens generated by the GPU 174 may be provided to the display unit 110 and may be each displayed in each portion of the display unit 110.

The GPS chip 125 may receive a global positioning system (GPS) signal from a GPS satellite to calculate a current location of the device 100. The control unit 170 may calculate a user location by using the GPS chip 125, when a navigation program is used or on other occasions when a current user location is needed.

The communication unit 130 may perform communication with various types of external devices 100, according to various types of communication methods. The communication unit 130 may include at least one selected from a WiFi chip 131, a Bluetooth chip 132, a wireless communication chip 133, and an NFC chip 134. The control unit 170 may perform communication with various external devices 100 by using the communication unit 130.

The WiFi chip 131 and the bluetooth chip 132 may perform communication by respectively using a WiFi method and a bluetooth method. When the WiFi chip 131 or the bluetooth chip 132 is used, various connection information such as SSID and a session key is firstly transferred and received, and then, communication is connected by using the various connection information, in order to transfer and receive various information. The wireless communication chip 133 refers to a chip performing communication according to various communication standards, such as IEEE, Zigbee, $3^{rd}$ generation (3G), $3^{rd}$ generation partnership project (3GPP), and long term evolution (LTE). The NFC chip 134 refers to a chip operating in a near field communication (NFC) method using 13.56 MHz zone from among various RF-ID frequency zones, including 135 kHz, 13.56 MHz, 433 MHz, 860-960 MHz, and 2.45 GHz.

The video processor 135 may process content received via the communication unit 130 or video data included in content stored in the memory 120. The video processor 135 may perform various image processing with respect to the video data, such as decoding, scaling, noise filtering, frame rate conversion, and resolution conversion.

The audio processor 140 may process content received via the communication unit 130 or audio data included in the content stored in the memory 120. The audio processor 140 may perform various processing with respect to the audio data, such as decoding, amplification, and noise filtering.

The control unit 170 may drive the video processor 135 and the audio processor 140 when a reproducing program with respect to multimedia content is executed, in order to reproduce corresponding content. The speaker portion 160 may output audio data generated by the audio processor 140.

The user input unit 145 may receive an input of various command languages from a user. The user input unit 145 may include at least one selected from a key 146, a touch panel 147, and a pen recognition panel 148.

The key 146 may include various types of keys, such as a mechanical button and a wheel, formed in various portions of an external body of the device 100, such as a front portion, a side portion, and a rear portion.

The touch panel 147 may sense a touch input of a user and may output a touch event value corresponding to the sensed touch signal. When the touch panel 147 is formed as the touch screen by being combined with the display panel 111, the touch screen may be realized as various types of touch sensors, such as a capacitive type, a decompression type, and a piezoelectric type. The capacitive type uses a method of calculating a touch coordinate by sensing fine electricity caused by a human body of a user when a part of the human body of the user touches a surface of the touch screen, by using a dielectric coated on the surface of the touch screen. The decompression type uses a method of including two electrode plates equipped in the touch screen and calculating a touch coordinate by sensing a current flow due to the upper and bottom plates contacting each other at a touched point, when a user touches a screen. The touch event occurring in the touch screen may be generated mainly by a finger of a human being, but may also be generated by an object of a conductive material which may cause a change in a capacitance.

The pen recognition panel 148 may sense a proximate input of a pen or a touch input of a pen according to an operation of a touch pen (for example, a stylus pen) or a digitizer pen by a user, and may output a pen proximate event or a pen touch event that is sensed. The pen recognition panel 148 may be realized for example as an EMR method and may sense a touch or proximate input, according to a change in a strength of an electromagnetic field due to approaching or a touch of a pen. In detail, the pen recognition panel 148 may be formed by including an electronic induction coil sensor (not shown) having a grid structure, and an electronic signal processing unit (not shown) sequentially providing indirect signals having pre-determined frequencies in each loop coil of the electronic induction coil sensor. If there is a pen in which a resonator circuit is equipped, around the loop coil of the pen recognition panel 148, the magnetic field transferred from the corresponding loop coil may generate a current based on mutual electromagnetic induction, in the resonator circuit in the pen. Based on the current, an inductive magnetic field is generated from a coil forming the resonator circuit in the pen, and the pen recognition panel 148 may detect the inductive magnetic field in the loop coil in a state of signal reception, so that an approaching or a touch location of the pen may be sensed. The pen recognition panel 148 may be provided below the display panel 111, by having a pre-determined area, for example, an area which may cover a display portion of the display panel 111.

The microphone portion 150 may receive an input of a user's sound or other noises and convert the input into audio data. The control unit 170 may use the user's sound input through the microphone portion 150 in a calling operation or may convert the user's sound into audio data to store the audio data in the memory 120.

The photographing portion 155 may photograph a still image or a video according to a control of a user. The photographing portion 155 may be realized in a multiple number, for example including a front camera and a rear camera.

When the photographing portion 155 and the microphone portion 150 are provided, the control unit 170 may perform a control operation according to a user's sound input through the microphone portion 150 or a user's motion recognized by the photographing portion 155. For example, the device 100 may operate in a motion control mode or a sound control mode. When the device 100 operates in the motion control mode, the control unit 170 may active the photographing portion 155 to photograph the user and may track the motion change of the user to perform a control operation corresponding to the motion change of the user. When the device 100 operates in the sound control mode, the control unit 170 may analyze the user's sound input through the microphone portion 150 and may operate in a sound recognition mode that performs a control operation according to the analyzed user's sound.

The motion detection portion 165 may sense a motion of a body of the device 100. The device 100 may rotate or may tilt in various directions. Here, the motion detection portion 165 may detect characteristics of the motion, such as a direction and angle of the rotation, and a tilting degree, by using at least one of various sensors, such as an earth magnetic sensor, a gyro sensor, and an acceleration sensor.

In addition, although it is not illustrated in FIG. 17, according to embodiments, the device 100 may further include a USB port to which a USB connector may be connected, various external input ports for connections with various external terminals, such as a headset, a mouse, and LAN, a DMB chip receiving and processing a digital multimedia broadcasting (DMB) signal, and various sensors.

Names of the above-described components of the device 100 may vary. Also, the device 100 may be formed by including one of the above-described components, by omitting some of the above-described components, or by further including additional components.

The one or more embodiments may be embodied as a recording medium, e.g., a program module to be executed in computers, which include computer-readable commands. A computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable medial, which have been implemented by an arbitrary method or technology, for storing information such as computer-readable commands, data structures, program modules, and other data. The communication medium typically includes a computer-readable command, a data structure, a program module, other data of a modulated data signal, or another transmission mechanism, and an example thereof includes an arbitrary information transmission medium.

While one or more exemplary embodiments have been particularly shown and described with reference to exemplary embodiments thereof, it will be understood by one of ordinary skill in the art that various changes in form and details may be made herein without departing from the spirit and scope of the present invention as defined by the following claims. Hence, it will be understood that the embodiments described above are not limiting of the scope of the invention. For example, each component described in a single type may be executed in a distributed manner, and components described distributed may also be executed in an integrated form.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

What is claimed is:
1. A device comprising:
   a display screen configured to display an on-screen keyboard for inputting data in a first input field among a plurality of input fields, and to display, on the on-screen keyboard, identification information of at least one input field other than the first input field, from among the plurality of input fields;
a user input interface configured to receive a user input selecting one of a plurality of pieces of identification information identifying the at least one input field; and
a controller comprising a memory storing instructions and at least one processor executing the stored instructions to set, as a second input field in which data is to be input via the on-screen keyboard, the at least one input field whose identification information is selected,
wherein the user input interface receives a user input for inputting data having a predetermined order of the plurality of input fields in the display screen via the on-screen keyboard,
wherein the controller controls the display screen to display a first drop-down menu for selecting one of a plurality of previous input fields that are previous to the first input field, in accordance with the predetermined order of the plurality of input fields, and controls the display screen to display a second drop-down menu for selecting one of a plurality of next input fields that are next to the first input field, in accordance with the predetermined order of the plurality of input fields, and
where the second drop-down menu comprises at least one hidden input field which is hidden by the on-screen keyboard.

2. The device of claim 1, wherein the on-screen keyboard comprises a text box indicating a key value of a key selected by a user from among a plurality of keys in the on-screen keyboard.

3. The device of claim 1, wherein the identification information of the at least one input field comprises at least one of a field name of the at least one input field and an icon indicating the at least one input field.

4. The device of claim 1, wherein the on-screen keyboard comprises a portion indicating whether the first input field is an input field corresponding to a pre-requisite item.

5. The device of claim 1, wherein the display screen displays the at least one input field such that an input field from among the at least one input field whose field value is input is distinguished from an input field from among the at least one input field whose field value is not input.

6. The device of claim 1, wherein the controller controls the display screen to display a third drop-down menu for selecting one of input fields in which field values have been input, in accordance with the predetermined order of the plurality of input fields, and controls the display screen to display a fourth drop-down menu for selecting one of input fields in which field values have not been input, in accordance with the predetermined order of the plurality of input fields.

7. A method of inputting information, the method comprising:
displaying an on-screen keyboard for inputting data in a first input field among a plurality of input fields, and displaying on the on-screen keyboard, identification information of at least one input field other than the first input field, from among the plurality of input fields;
receiving a user input selecting one of a plurality of pieces of identification information identifying the at least one input field; and
setting, as a second input field in which data is to be input via the on-screen keyboard, the at least one input field whose identification information is selected,
wherein the receiving the user input comprises receiving a user input for inputting data having a predetermined order of the plurality of input fields in the display screen via the on-screen keyboard,
wherein the displaying the on-screen keyboard comprises displaying a first drop-down menu for selecting one of a plurality of previous input fields that are previous to the first input field, in accordance with the predetermined order of the plurality of input fields, and displaying a second drop-down menu for selecting one of a plurality of next input fields that are next to the first input field, in accordance with the predetermined order of the plurality of input fields, and
wherein the second drop-down menu comprises at least one hidden input field which is hidden by the on-screen keyboard.

8. The method of claim 7, wherein the on-screen keyboard comprises a text box indicating a key value of a key selected by a user from among a plurality of keys in the on-screen keyboard.

9. The method of claim 7, wherein the identification information of the at least one input field comprises at least one of a field name of the at least one input field and an icon indicating the at least one input field.

10. The method of claim 7, wherein the on-screen keyboard comprises a portion indicating whether the first input field is an input field corresponding to a pre-requisite item.

11. The method of claim 7, wherein the displaying of the identification information of the at least one input field other than the first input field, from among the plurality of input fields, comprises displaying the at least one input field such that an input field from among the at least one input field whose field value is input is distinguished from an input field from among the at least one input field whose field value is not input.

12. The method of claim 7, further comprising:
displaying a third drop-down menu for selecting one of input fields in which field values have been input, in accordance with the predetermined order of the plurality of input fields, and
displaying a fourth drop-down menu for selecting one of input fields in which field values have not been input, in accordance with the predetermined order of the plurality of input fields.

* * * * *